(12) United States Patent
Muramatsu et al.

(10) Patent No.: US 10,930,438 B2
(45) Date of Patent: Feb. 23, 2021

(54) MULTILAYER CERAMIC CAPACITOR WITH REDUCED THICKNESS

(71) Applicant: Murata Manufacturing Co., Ltd., Nagaokakyo (JP)

(72) Inventors: Satoshi Muramatsu, Nagaokakyo (JP); Yuki Koyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 143 days.

(21) Appl. No.: 16/041,859

(22) Filed: Jul. 23, 2018

(65) Prior Publication Data

US 2019/0027312 A1 Jan. 24, 2019

(30) Foreign Application Priority Data

Jul. 24, 2017 (JP) .............................. JP2017-143077
Apr. 27, 2018 (JP) .............................. JP2018-087673

(51) Int. Cl.
*H01G 4/30* (2006.01)
*H01G 4/232* (2006.01)
*H01G 4/12* (2006.01)
*H01G 4/012* (2006.01)

(52) U.S. Cl.
CPC .............. *H01G 4/30* (2013.01); *H01G 4/012* (2013.01); *H01G 4/12* (2013.01); *H01G 4/1227* (2013.01); *H01G 4/232* (2013.01)

(58) Field of Classification Search
CPC combination set(s) only.
See application file for complete search history.

(56) References Cited

U.S. PATENT DOCUMENTS

| 6,038,121 A | * | 3/2000 | Naito | H01G 4/232 361/303 |
| 7,145,429 B1 | * | 12/2006 | Togashi | H01G 4/232 336/200 |
| 9,099,247 B1 | | 8/2015 | Kitano et al. | |
| 2008/0297976 A1 | * | 12/2008 | Togashi | H01G 4/232 361/306.3 |
| 2009/0086406 A1 | * | 4/2009 | Lee | H01G 4/228 361/306.3 |

(Continued)

FOREIGN PATENT DOCUMENTS

| CN | 104299784 A | * | 1/2015 | ............... G01G 4/12 |
| JP | 2015-037186 A | | 2/2015 | |

(Continued)

*Primary Examiner* — David M Sinclair
(74) *Attorney, Agent, or Firm* — Keating & Bennett, LLP

(57) ABSTRACT

A multilayer ceramic capacitor includes a laminate including dielectric layers and internal electrodes that are laminated, and external electrodes disposed on side surfaces of the laminate to be connected to corresponding internal electrodes. A dimension L of the multilayer ceramic capacitor in its lengthwise direction and a dimension W in its width direction satisfy: about 0.85≤W/L≤about 1, and L≤about 750 μm, and a dimension T in its lamination direction satisfies: about 70 μm≤T≤about 110 μm. The laminate has a dimension t in the lamination direction, and a region in which the internal electrodes are laminated has a dimension t' in the lamination direction, and a ratio of the dimensions satisfies: t'/t≥about 0.55.

19 Claims, 25 Drawing Sheets

(56) References Cited

U.S. PATENT DOCUMENTS

| | | | |
|---|---|---|---|
| 2010/0271751 A1* | 10/2010 | Sasabayashi | H01G 4/012 |
| | | | 361/301.4 |
| 2013/0201601 A1* | 8/2013 | Nishisaka | H01G 13/006 |
| | | | 361/301.4 |
| 2014/0367152 A1* | 12/2014 | Lee | H05K 1/111 |
| | | | 174/260 |
| 2015/0021079 A1* | 1/2015 | Lee | H05K 1/185 |
| | | | 174/260 |
| 2015/0022942 A1* | 1/2015 | Chae | H01G 4/30 |
| | | | 361/301.4 |
| 2015/0041199 A1 | 2/2015 | Lee et al. | |
| 2015/0083475 A1 | 3/2015 | Kim et al. | |
| 2015/0114705 A1* | 4/2015 | Ahn | H01G 2/065 |
| | | | 174/260 |
| 2015/0131253 A1* | 5/2015 | Park | H01G 4/236 |
| | | | 361/782 |
| 2017/0162329 A1* | 6/2017 | Ota | H01L 41/0472 |
| 2017/0229245 A1* | 8/2017 | Nakazawa | H01G 4/2325 |

FOREIGN PATENT DOCUMENTS

| | | |
|---|---|---|
| JP | 2015-065394 A | 4/2015 |
| KR | 10-2015-0010684 A | 1/2015 |

\* cited by examiner

IV-IV SECTIONAL VIEW $E = e_1 + e_2 + e_3 + e_4$ $B = b_1 + b_2 + b_3 + b_4$

XVII-XVII SECTIONAL VIEW $$114 \begin{cases} 114a \\ 114b \end{cases}$$

$$115 \begin{cases} 115a \\ 115b \end{cases}$$

FIG. 19A
FIG. 19B
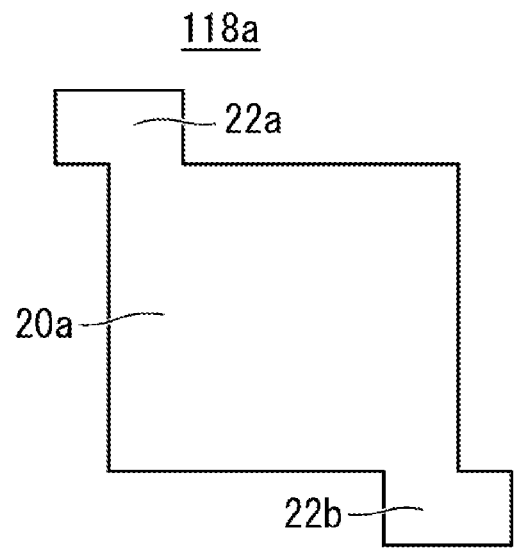
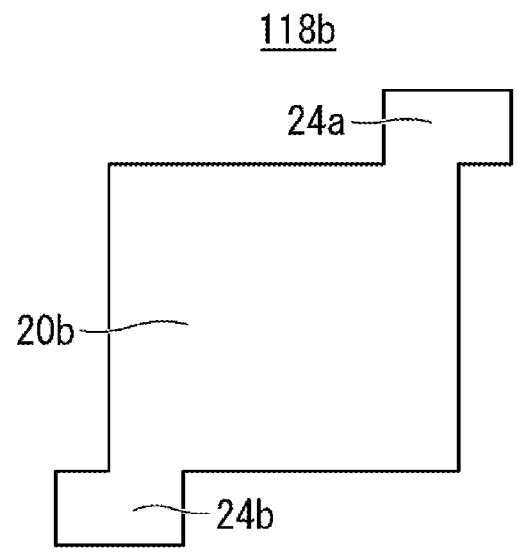
FIG. 20
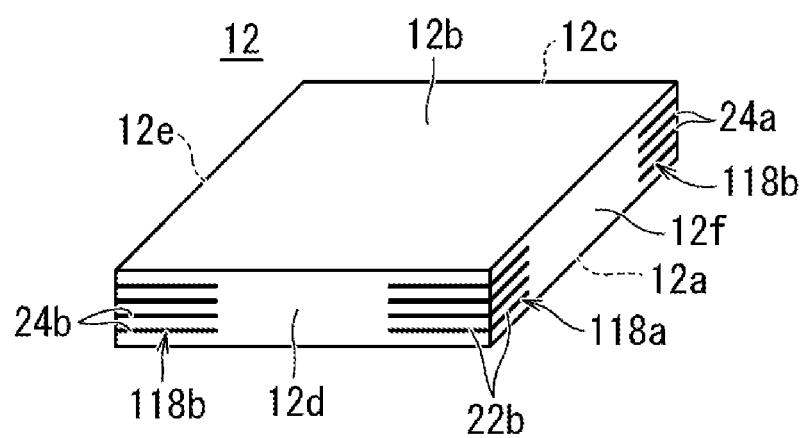

FIG. 21A
FIG. 21B
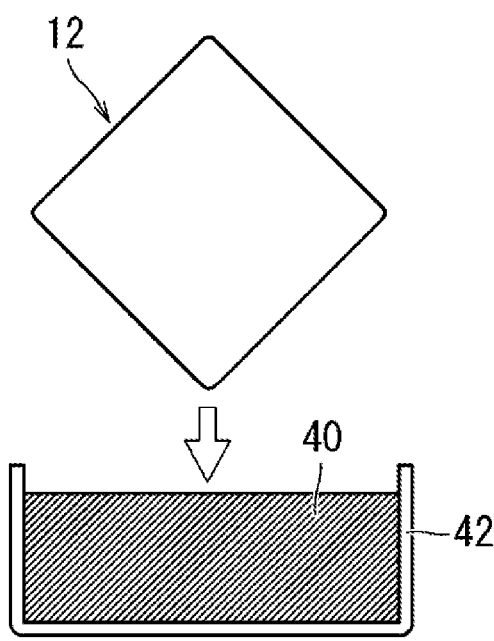
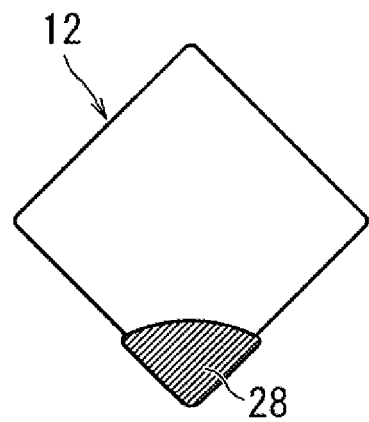
FIG. 22
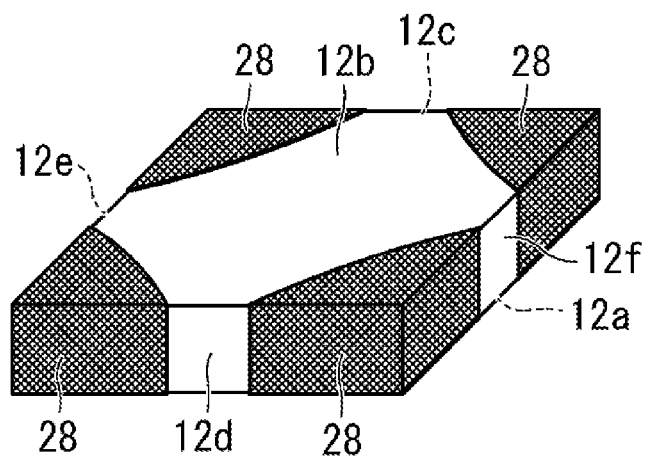

XXVI-XXVI SECTIONAL VIEW

MULTILAYER CERAMIC CAPACITOR WITH REDUCED THICKNESS

CROSS REFERENCE TO RELATED APPLICATIONS

This application claims the benefit of priority to Japanese Patent Application No. 2017-143077 filed on Jul. 24, 2017 and Japanese Patent Application No. 2018-087673 filed on Apr. 27, 2018. The entire contents of these applications are hereby incorporated herein by reference.

BACKGROUND OF THE INVENTION

1. Field of the Invention

The present invention relates to a multilayer ceramic capacitor.

2. Description of the Related Art

In recent years, reduction in size and thickness of electronic apparatuses, such as mobile phones and portable music players, has been advancing. Many multilayer ceramic electronic components are mounted on an electronic apparatus, and as electronic apparatuses have been reduced in size, multilayer ceramic electronic components to be mounted on electronic apparatuses are each also becoming smaller and thinner by being embedded in a substrate or mounted on a substrate surface. Due to the reduction in thickness of multilayer ceramic capacitors as described above, it is difficult to ensure sufficient strength of the multilayer ceramic capacitors.

A multilayer ceramic capacitor as disclosed in Japanese Patent Application Laid-Open No. 2015-65394 is suggested as a multilayer ceramic electronic component with improved chip strength. This multilayer ceramic capacitor is a substrate-built-in multilayer ceramic capacitor capable of preventing breakage, such as cracking, from occurring by not only forming a band surface of an external electrode of a certain length or longer for connecting external wiring through a via hole, but also reducing thickness of the external electrode, to decrease thickness of a ceramic body in the entire chip.

Unfortunately, while the multilayer ceramic capacitor disclosed in Japanese Patent Application Laid-Open No. 2015-65394 has a thickness of 300 μm in a lamination direction, further reduction in the size and thickness of electronic apparatuses in recent years requires further reduction in thickness of multilayer ceramic capacitors. This reduction in thickness may cause a problem of deterioration in deflective strength of a multilayer ceramic capacitor.

SUMMARY OF THE INVENTION

Preferred embodiments of the present invention provide multilayer ceramic capacitors capable of ensuring deflective strength even when being reduced in thickness.

A multilayer ceramic capacitor according to a preferred embodiment of the present invention includes a laminate including a plurality of dielectric layers and a plurality of internal electrodes, being laminated; a first main surface and a second main surface, facing each other in a lamination direction; a first side surface and a second side surface, facing each other in a lengthwise direction orthogonal or substantially orthogonal to the lamination direction; and a third side surface and a fourth side surface, being orthogonal or substantially orthogonal to each other in a width direction orthogonal or substantially orthogonal to the lamination direction and the lengthwise direction, and a plurality of external electrodes disposed on the corresponding side surfaces of the laminate. The plurality of internal electrodes include a plurality of first internal electrodes and a plurality of second internal electrodes, and the plurality of first internal electrodes and the plurality of second internal electrode are alternately laminated with the dielectric layers interposed therebetween. The first internal electrodes each include a first extended portion extending to one of the first side surface, the second side surface, the third side surface, and the fourth side surface, and a second extended portion extending to one of the side surfaces other than that to which the first extended portion is extended. The second internal electrodes each include a third extended portion that extends to one of the first side surface, the second side surface, the third side surface, and the fourth side surface, and a fourth extended portion that extends to one of the side surfaces other than that to which the third extended portion is extended. The plurality of external electrodes each extend to the second main surface, and include a first external electrode connected to the first extended portion, a second external electrode connected to the second extended portion, a third external electrode connected to the third extended portion, and a fourth external electrode connected to the fourth extended portion. The multilayer ceramic capacitor has a dimension L in the lengthwise direction and a dimension W in the width direction. The dimensions satisfy about $0.85 \leq W/L \leq$ about 1, and $L \leq$ about 750 μm. The multilayer ceramic capacitor has a dimension T in the lamination direction, and the dimension T satisfies about 70 μm $\leq T \leq$ about 110 μm. The laminate has a dimension t in the lamination direction, and a region in which the first internal electrode and the second internal electrode are laminated has a dimension t' in the lamination direction, a ratio of the dimensions satisfy $t'/t \geq$ about 0.55.

In a multilayer ceramic capacitor according to a preferred embodiment of the present invention, it is preferable that a straight line connecting the first extended portion and the second extended portion and a straight line connecting the third extended portion and the fourth extended portion intersect each other when the multilayer ceramic capacitor is viewed from the lamination direction.

In a multilayer ceramic capacitor according to a preferred embodiment of the present invention, it is also preferable that the first extended portion and the fourth extended portion extend to positions facing each other, and the second extended portion and the third extended portion extend to positions facing each other, on the corresponding side surfaces of the laminate.

In a multilayer ceramic capacitor according to a preferred embodiment of the present invention, it is preferable that the plurality of external electrodes disposed on the corresponding side surfaces of the laminate have a total length E and the multilayer ceramic capacitor has an outer peripheral length B, a ratio E/B preferably being about 0.33 or more and about 0.83 or less, and that a distance G between the external electrodes adjacent to each other in the plurality of external electrodes disposed on the second main surface is about 100 μm or more.

In addition, in a multilayer ceramic capacitor according to a preferred embodiment of the present invention, when the corresponding one of the internal electrodes is extended to at least one of the first side surface and the second side surface, it is preferable that a distance $g_1$ between the external electrodes adjacent to each other, disposed on the side surface to which an internal electrode is extended, and the dimension W of the multilayer ceramic capacitor in the width direction satisfy $g_1/W \leq$ about 0.42. When the corresponding one of the internal electrodes is extended to at least one of the third side surface and the fourth side surface, it is preferable that a distance $g_2$ between the external electrodes adjacent to each other, disposed on the side surface to which an internal electrode is extended, and the dimension L of the multilayer ceramic capacitor in the lengthwise direction satisfy $g_2/L \leq$ about 0.42. When the corresponding one of the internal electrodes is extended to at least one of the first side surface and the second side surface, and the corresponding one of the internal electrodes is extended to at least one of the third side surface and the fourth side surface, it is preferable that the distance $g_1$ between the external electrodes adjacent to each other, disposed on the at least one of the first side surface and the second side surface to which an internal electrode is extended, and the distance $g_2$ between the external electrodes adjacent to each other, disposed on the at least one of the third side surface and the fourth side surface to which an internal electrode is extended, satisfy $g_1/W \leq$ about 0.42, and $g_2/L \leq$ about 0.42.

In a multilayer ceramic capacitor according to a preferred embodiment of the present invention, it is preferable that the external electrode disposed on the side surface to which no internal electrode is extended covers any one of short sides of the side surface and a portion from opposite ends of the one short side to an intermediate portion of each of long sides thereof, in a U-shape.

In a multilayer ceramic capacitor according to a preferred embodiment of the present invention, when the external electrode disposed on the side surface to which no internal electrode is extended has a length β in a direction connecting short sides of the external electrode covering the short side of the side surface to which no internal electrode is extended, and a length α in a direction connecting the short sides of the external electrode covering long sides of the side surface, it is preferable that a ratio β/α is about 0.2 or more and less than about 1.0.

In a multilayer ceramic capacitor according to a preferred embodiment of the present invention, when the external electrode disposed on the side surface to which no internal electrode is extended has the length β in the direction connecting short sides of the external electrode covering the short side of the side surface to which no internal electrode is extended, and the length α in the direction connecting the short sides of the external electrode covering long sides of the side surface, it is further preferable that the ratio β/α is about 0.2 or more and about 0.5 or less.

In a multilayer ceramic capacitor according to a preferred embodiment of the present invention, it is preferable that the plurality of external electrodes are not disposed on the first main surface.

In a multilayer ceramic capacitor according to a preferred embodiment of the present invention, the dimension L in the length direction and the dimension W in the width direction of the multilayer ceramic capacitor satisfy about $0.85 \leq W/L \leq$ about 1, and L ≤ about 750 μm, the dimension T of the multilayer ceramic capacitor in the lamination direction satisfies about 70 μm ≤ T ≤ about 110 μm, and the dimension t of the laminate in the lamination direction and the dimension t' of the region in which the first internal electrode and the second internal electrode are laminated, in the lamination direction, satisfy t'/t ≥ about 0.55. This enables a multilayer ceramic capacitor capable of ensuring deflective strength even when being relatively reduced in thickness to be obtained.

When a multilayer ceramic capacitor according to a preferred embodiment of the present invention is viewed from the lamination direction, the straight line connecting the first extended portion and the second extended portion and the straight line connecting the third extended portion and the fourth extended portion intersect each other, or the first extended portion and the fourth extended portion extend to positions facing each other, and the second extended portion and the third extended portion extend to positions facing each other, on the corresponding side surfaces of the laminate. This causes currents flowing through respective extended portions to flow in directions opposite to each other when voltage is applied. As a result, an effect of reducing equivalent series inductance (ESL) being a parasitic component of the multilayer ceramic capacitor is able to be obtained.

When a multilayer ceramic capacitor according to a preferred embodiment of the present invention has a ratio E/B of about 0.33 or more and about 0.83 or less, where E designates a total length of the plurality of external electrodes disposed on the side surfaces of the laminate, and B designates a peripheral length of the multilayer ceramic capacitor, and a distance G between adjacent external electrodes in a plurality of external electrodes disposed on the second main surface is about 100 μm or more, a short circuit between external electrodes due to migration when the multilayer ceramic capacitor is mounted on a substrate is able to be prevented from occurring and bonding strength at the time of mounting is able to be maintained.

In addition, when a multilayer ceramic capacitor according to a preferred embodiment of the present invention is under conditions as follows: when the corresponding one of the internal electrodes is extended to at least one of the first side surface and the second side surface, the distance $g_1$ between the external electrodes adjacent to each other, disposed on the side surface to which an internal electrode is extended, and the dimension W of the multilayer ceramic capacitor in the width direction satisfy $g_1/W \leq$ about 0.42; when the corresponding one of the internal electrodes is extended to at least one of the third side surface and the fourth side surface, the distance $g_2$ between the external electrodes adjacent to each other, disposed on the side surface to which an internal electrode is extended, and the dimension L of the multilayer ceramic capacitor in the lengthwise direction satisfy $g_2/L \leq$ about 0.42; and when the corresponding one of the internal electrodes is extended to at least one of the first side surface and the second side surface, and the corresponding one of the internal electrodes is extended to at least one of the third side surface and the fourth side surface, the distance $g_1$ between the external electrodes adjacent to each other, disposed on at least any one of the first side surface and the second side surface to which an internal electrode is extended, and the distance $g_2$ between the external electrodes adjacent to each other, disposed on at least any one of the third side surface and the fourth side surface to which an internal electrode is extended, satisfy $g_1/W \leq$ about 0.42, and $g_2/L \leq$ about 0.42, an effect of reducing equivalent series inductance (ESL) being a parasitic component of the multilayer ceramic capacitor is able to be obtained.

Further, when a multilayer ceramic capacitor according to a preferred embodiment of the present invention is configured such that the external electrode disposed on the side surface to which no internal electrode is extended covers any one of short sides of the side surface and a portion from opposite ends of the one short side to an intermediate portion of each of long sides thereof, in a U-shape, a short circuit between external electrodes due to migration when the multilayer ceramic capacitor is mounted on a substrate is able to be further prevented from occurring.

In a multilayer ceramic capacitor according to a preferred embodiment of the present invention, when the plurality of external electrodes are not disposed on the first main surface, the multilayer ceramic capacitor is able to be reduced in T dimension in a lamination direction x. As a result, a multilayer ceramic capacitor with a further reduced thickness are able to be obtained.

According to preferred embodiments of the present invention, multilayer ceramic capacitors capable of ensuring deflective strength even when being relatively reduced in thickness is able to be obtained.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 19A illustrates a first internal electrode pattern of the multilayer ceramic capacitor illustrated in FIG. 14, and FIG. 19B illustrates a second internal electrode pattern thereof.

FIG. 20 is an external perspective view of a laminate of the multilayer ceramic capacitor of FIG. 14.

FIG. 21A illustrates a state in which an external electrode paste is applied to the laminate illustrated in FIG. 20, and FIG. 21B illustrates a state after the external electrode paste is applied to the laminate.

FIG. 22 is an external perspective view in which a base electrode layer is provided on the laminate illustrated in FIG. 20.

DETAILED DESCRIPTION OF THE PREFERRED EMBODIMENTS

First Preferred Embodiment

Figure 1:
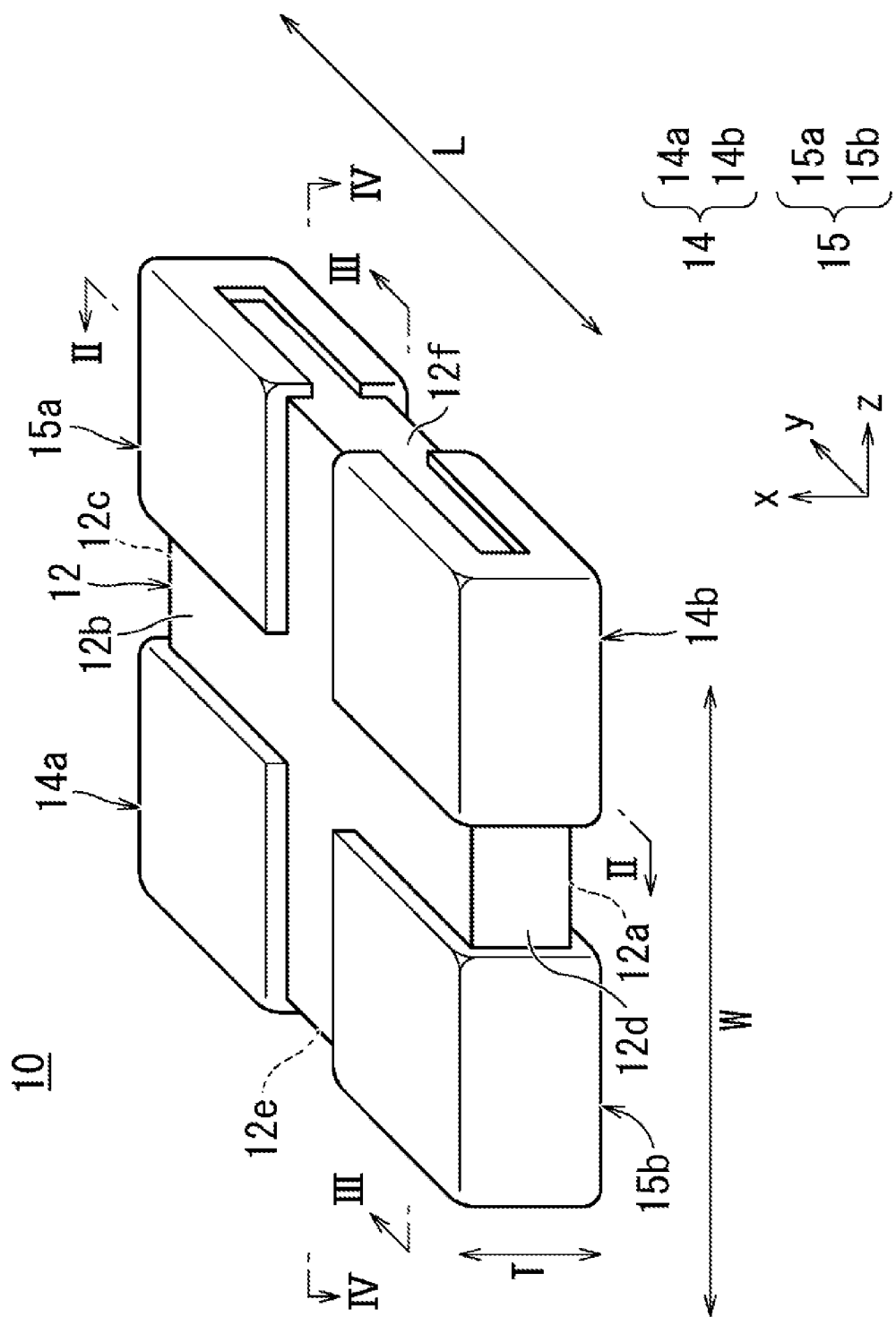
FIG. 1 is an external perspective view illustrating a first preferred embodiment of a multilayer ceramic capacitor according to the present invention.
Figure 2:
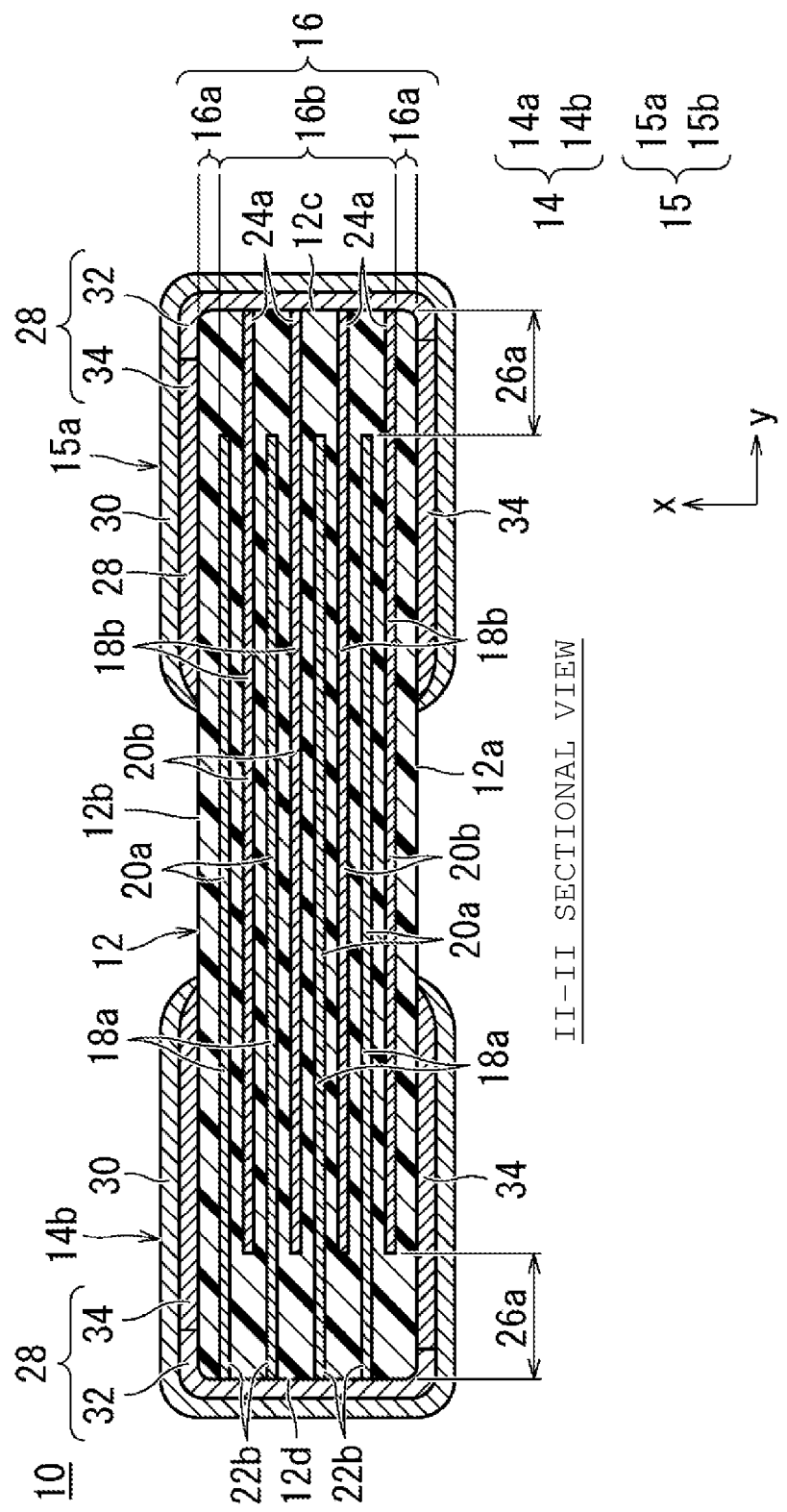
FIG. 2 is a sectional view of the multilayer ceramic capacitor illustrated in FIG. 1, taken along line II-II.
Figure 3:
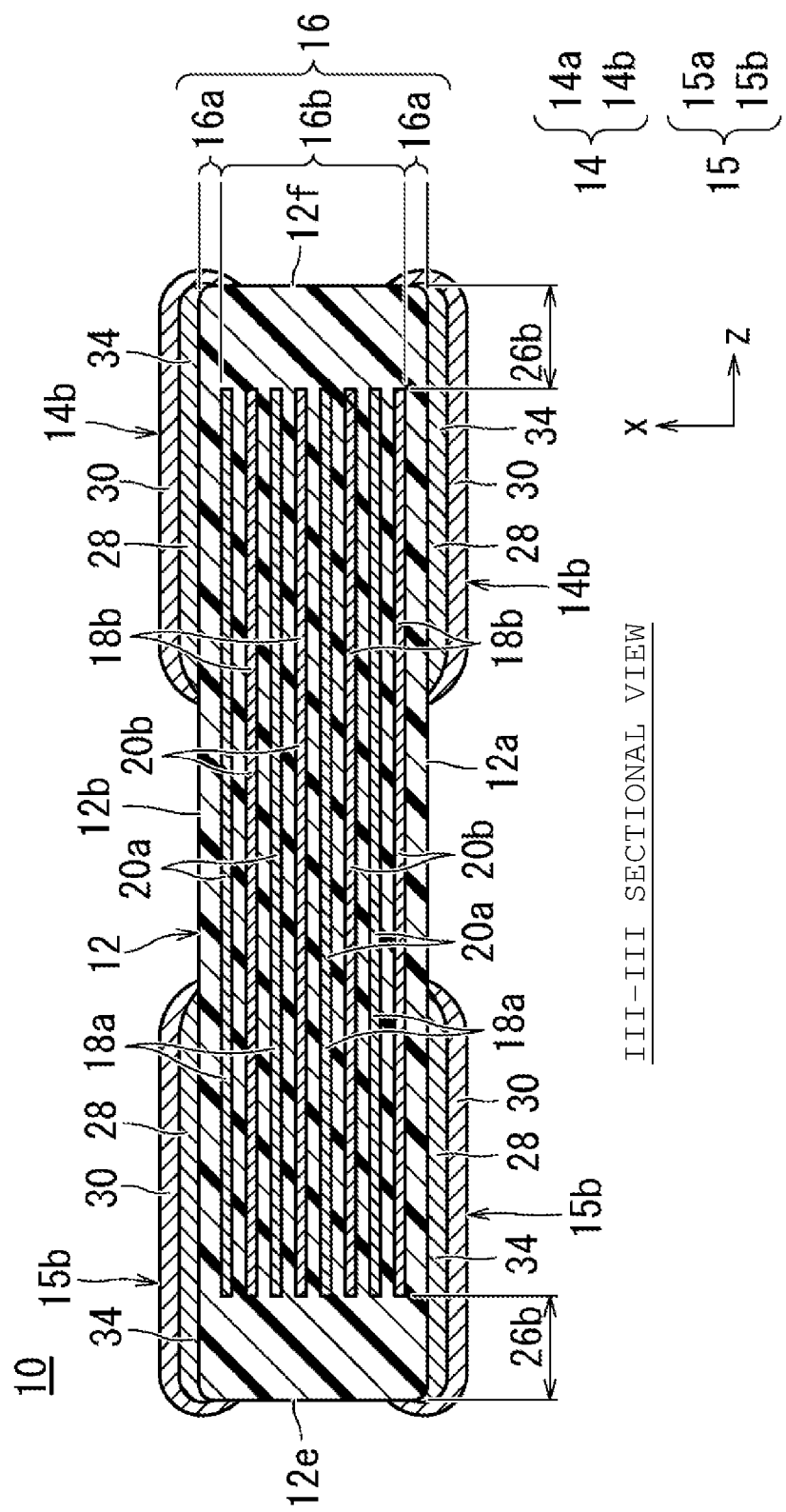
FIG. 3 is a sectional view of the multilayer ceramic capacitor illustrated in FIG. 1, taken along line III-III.
Figure 4:
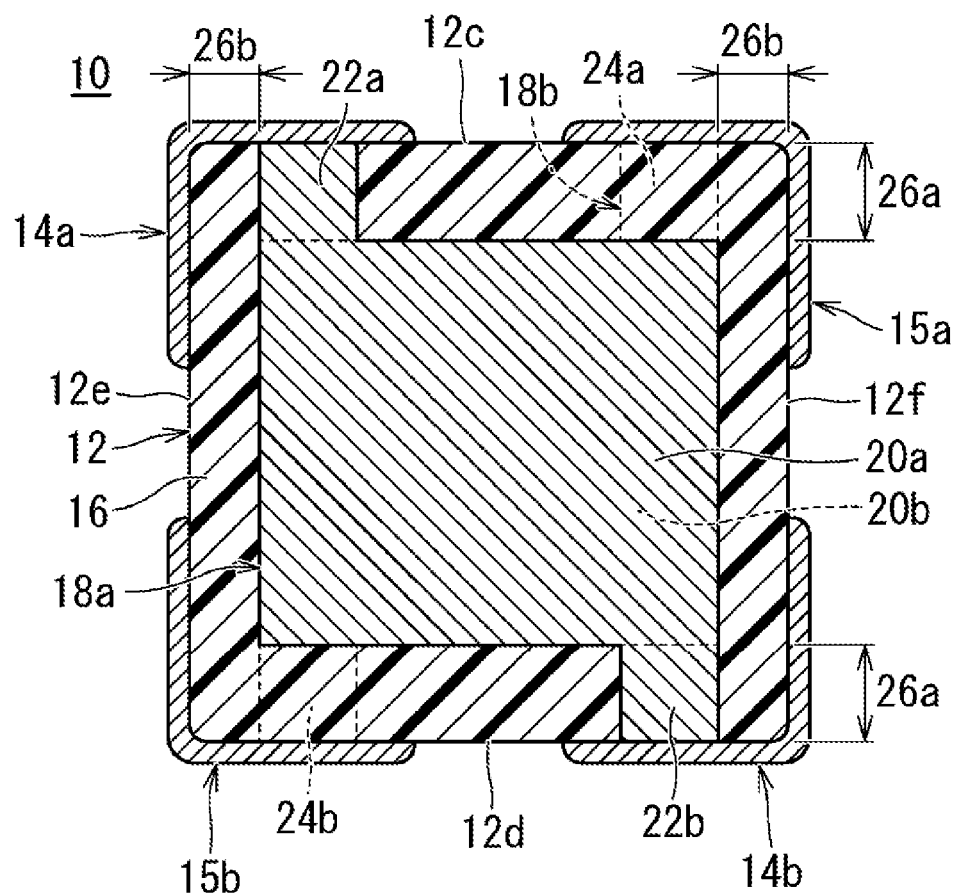
FIG. 4 is a sectional view of the multilayer ceramic capacitor illustrated in FIG. 1, taken along line IV-IV.
Figure 5:
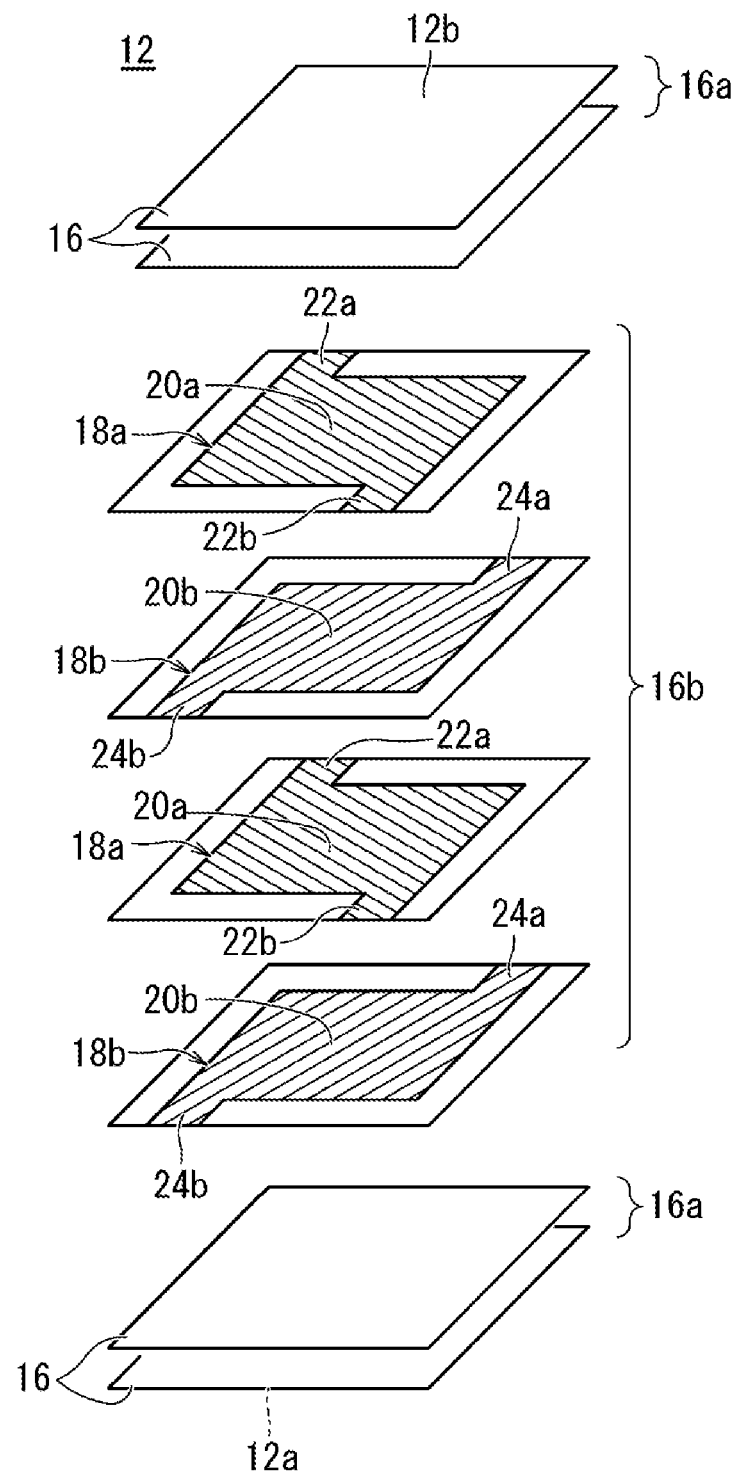
FIG. 5 is an exploded perspective view of a laminate illustrated in FIGS. 1 to 4.
Figure 6:
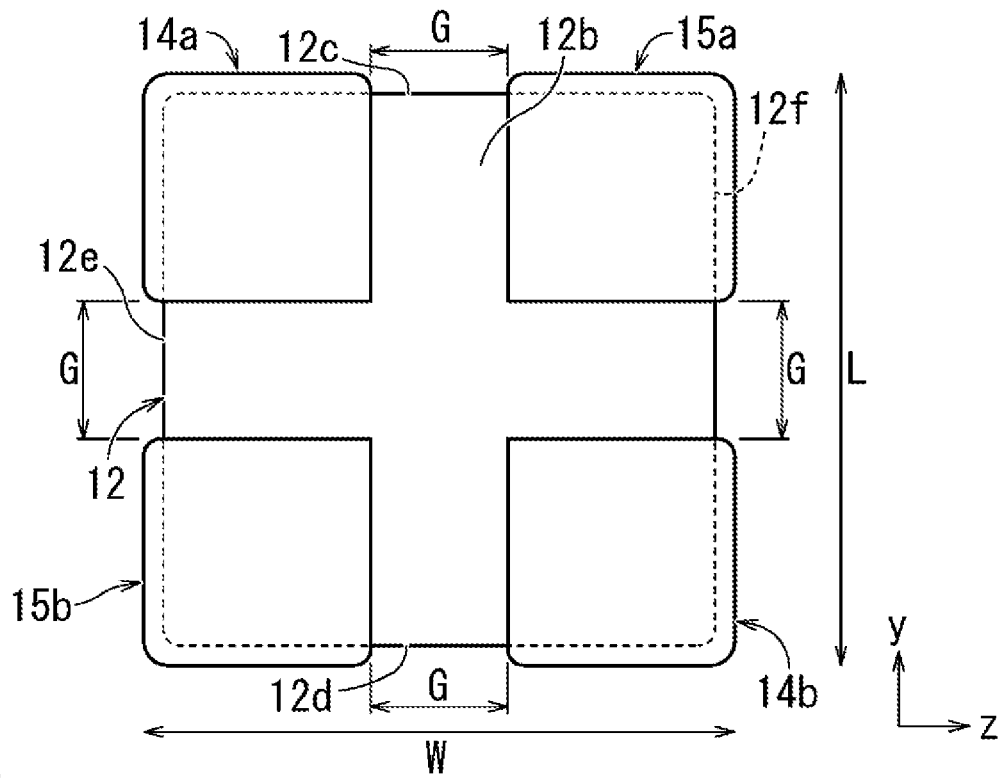
FIG. 6 is a plan view of the multilayer ceramic capacitor illustrated in FIG. 1.
Figure 7:
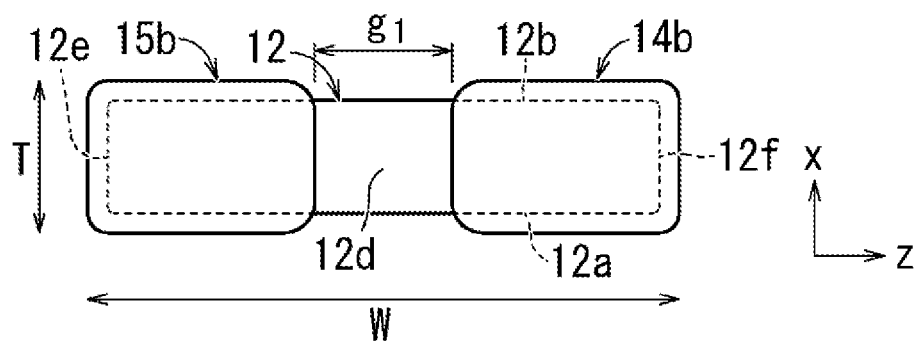
FIG. 7 is a front view of the multilayer ceramic capacitor illustrated in FIG. 1.
Figure 8:
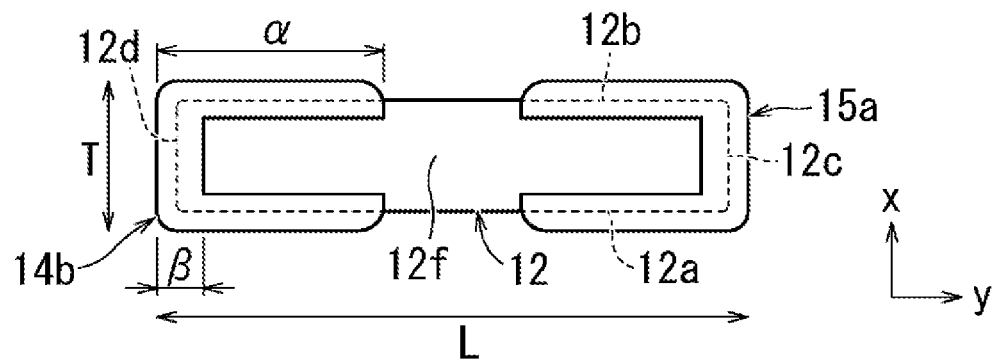
FIG. 8 is a right side view of the multilayer ceramic capacitor illustrated in FIG. 1.

A multilayer ceramic capacitor according to a first preferred embodiment of the present invention will be described. FIG. 1 is an external perspective view illustrating the first preferred embodiment of the multilayer ceramic capacitor according to the present invention, and FIG. 2 is a sectional view of the multilayer ceramic capacitor illustrated in FIG. 1, taken along line II-II. FIG. 3 is a sectional view of the multilayer ceramic capacitor illustrated in FIG. 1, taken along line III-III. FIG. 4 is a sectional view of the multilayer ceramic capacitor illustrated in FIG. 1, taken along line IV-IV. FIG. 5 is an exploded perspective view of a laminate illustrated in FIGS. 1 to 4. FIG. 6 is a plan view of the multilayer ceramic capacitor illustrated in FIG. 1, FIG. 7 is a front view of the multilayer ceramic capacitor illustrated in FIG. 1, and FIG. 8 is a right side view of the multilayer ceramic capacitor illustrated in FIG. 1.

A multilayer ceramic capacitor 10 includes a laminate 12 having a rectangular or substantially rectangular parallelepiped shape, and external electrodes 14 and 15.

The laminate 12 includes a plurality of dielectric layers 16 and a plurality of internal electrodes 18. The laminate 12 includes a first main surface 12a and a second main surface 12b, facing each other in a lamination direction x, a first side surface 12c and a second side surface 12d, facing each other in a length direction y orthogonal or substantially orthogonal to the lamination direction x, and a third side surface 12e and a fourth side surface 12f, facing each other in a width direction z orthogonal or substantially orthogonal to the lamination direction x and the length direction y. The first main surface 12a and the second main surface 12b each extend along the length direction y and the width direction z. The first side surface 12c and the second side surface 12d each extend along the lamination direction x and the width direction z. The third side surface 12e and the fourth side surface 12f each extend along the lamination direction x and the length direction y. Thus, the lamination direction x is a direction connecting the first main surface 12a and the second main surface 12b, the length direction y is a direction connecting the first side surface 12c and the second side surface 12d, and the width direction z is a direction connecting the third side surface 12e and the fourth side surface 12f.

It is preferable that the laminate 12 includes rounded corners and ridgeline portions. Each of the corners is a portion at which three surfaces of the laminate 12 intersect with each other, and each of the ridgeline portions is a portion at which two surfaces of the laminate 12 intersect with each other.

The dielectric layers 16 include outer layers 16a and effective layers 16b. The outer layers 16a are positioned on a first main surface 12a side and a second main surface 12b side of the laminate 12, and are positioned between the first main surface 12a and the internal electrode 18 closest to the first main surface 12a, and positioned between the second main surface 12b and the internal electrode 18 closest to the second main surface 12b. The outer layer 16a on one side preferably has a thickness of about 3 μm or more and about 15 μm or less, more preferably that of about 3 μm or more and about 13 μm or less, and still more preferably that of about 3 μm or more and about 9 μm or less, for example. The region sandwiched between both of the outer layers 16a is the effective layer 16b. That is, the effective layer 16b is a region in which the internal electrodes 18 are laminated.

When a dimension of the laminate 12 in the lamination direction x is indicated as t, and a dimension of the effective layer portion 16b in the lamination direction x is indicated as t', the following relationship is preferably satisfied: t'/t≥about 0.55, for example.

The dielectric layer 16 may be made of a dielectric material, for example. As the dielectric material, a dielectric ceramic including a main component, such as barium titanate, calcium titanate, strontium titanate, barium calcium titanate, or calcium zirconate, may be used, for example. When the above-described dielectric material is included as a main component, a dielectric ceramic to which a Mg compound, a Mn compound, a Si compound, an Al compound, a V compound, a Ni compound, a rare earth compound, or other suitable compound, is added as an accessory component with a content less than that of the main component, in accordance with desired characteristics of the multilayer ceramic capacitor 10, for example, may be used.

The dielectric layer 16 sandwiched between the internal electrodes 18 preferably has an average thickness of about 0.4 μm or more and about 1.0 μm or less, more preferably that of about 0.4 μm or more and about 0.8 μm or less, and still more preferably that of about 0.4 μm or more and about 0.6 μm or less, for example.

In the multilayer ceramic capacitor 10, the internal electrodes 18 are alternately laminated with the dielectric layer 16 interposed therebetween in the laminate 12, as illustrated in FIGS. 2 to 5.

The laminate 12 includes a plurality of first internal electrodes 18a and a plurality of second internal electrodes 18b as the plurality of internal electrodes 18. The first internal electrode 18a and the second internal electrode 18b are alternately laminated with the dielectric layer 16 interposed therebetween.

The first internal electrode 18a is disposed on a surface of the dielectric layer 16. The first internal electrode 18a includes a first opposed portion 20a facing the first main surface 12a and the second main surface 12b, and is laminated in a direction connecting the first main surface 12a and the second main surface 12b.

The second internal electrode 18b is disposed on a surface of the dielectric layer 16 different from the dielectric layer 16 on which the first internal electrode 18a is disposed. The second internal electrode 18b includes a second opposed portion 20b facing the first main surface 12a and the second main surface 12b, and is laminated in the direction connecting the first main surface 12a and the second main surface 12b.

The first internal electrode 18a is extended to the first side surface 12c of the laminate 12 by the first extended portion 22a, and is extended to the second side surface 12d of the laminate 12 by the second extended portion 22b. The first extended portion 22a extends to the third side surface 12e of the laminate 12, and the second extended portion 22b extends to the fourth side surface 12f of the laminate 12.

The second internal electrode 18b is extended to the first side surface 12c of the laminate 12 by the third extended portion 24a, and is extended to the second side surface 12d of the laminate 12 by the fourth extended portion 24b. The second extended portion 24a is extended to the fourth side surface 12f of the laminate 12, and the fourth extended portion 24b is extended to the third side surface 12e of the laminate 12.

The first internal electrode 18a and the second internal electrode 18b are not exposed on the third side surface 12e and the fourth side surface 12f of the laminate 12.

The first extended portion 22a of the first internal electrode 18a may be extended to one of the first side surface 12c, the second side surface 12d, the third side surface 12e, and the fourth side surface 12f. In this case, the second extended portion 22b of the first internal electrode 18a may be extended to one side surface other than the side surface to which the first extended portion 22a is extended.

The third extended portion 24a of the second internal electrode 18b may be extended to one of the first side surface 12c, the second side surface 12d, the third side surface 12e, and the fourth side surface 12f, and the fourth extended portion 24b of the second internal electrode 18b may be extended to one side surface other than the side surface to which the third extended portion 24a is extended.

When the multilayer ceramic capacitor 10 is viewed from the lamination direction x, it is preferable that a straight line connecting the first extended portion 22a and the second extended portion 22b of the first internal electrode 18a and a straight line connecting the third extended portion 24a and the fourth extended portion 24b of the second internal electrode 18b, intersect each other.

In addition, it is preferable that the first extended portion 22a of the first internal electrode 18a and the fourth extended portion 24b of the second internal electrode 18b are extended to positions facing each other, and the second extended portion 22b of the first internal electrode 18a and the third extended portion 24a of the second internal electrode 18b are extended to positions facing each other, in the side surfaces 12c, 12d, 12e, and 12f of the laminate 12.

The laminate 12 includes a side portion (L gap) 26a that is provided between one end of the first opposed portion 20a in the longitudinal direction y and the first side surface 12c and between the other end of the second opposed portion 20a in the longitudinal direction y and the second side surface 12d. The side portion (L gap) 26a of the laminate 12 preferably has an average length in the longitudinal direction y of about 10 µm or more and about 60 µm or less, more preferably that of about 10 µm or more and about 30 µm or less, and still more preferably that of about 10 µm or more and about 20 µm or less, for example.

In addition, the laminate 12 includes a side portion (W gap) 26b that is provided between one end of the first opposed portion 20a in the width direction z and the third side surface 12e and between the other end of the second opposed portion 20a in the width direction z and the fourth side surface 12f. The side portion (W gap) 26b of the laminate 12 preferably has an average length in the width direction z of about 10 µm or more and about 60 µm or less, more preferably that of about 10 µm or more and about µm or less, and still more preferably that of about 10 µm or more and about 20 µm or less, for example.

The internal electrode 18 may preferably be made of metal, such as Ni, Cu, Ag, Pd, or Au, or alloy including one of these metals, such as Ag—Pd alloy, for example. The internal electrode 18 may further include dielectric grains with the same composition base as that of the ceramic included in the dielectric layer 16. It is preferable that the number of laminations of the plurality of internal electrodes 18 is not less than 20 and not more than 80, for example. The internal electrode 18 preferably has an average thickness of about 0.3 µm or more and about 1.0 µm or less, and more preferably that of about 0.6 µm or more and about 1.0 µm or less, for example.

External electrodes 14 and 15 are provided on the first side surface 12c and the second side surface 12d of the laminate 12.

The external electrode 14 includes a first external electrode 14a electrically connected to the first extended portion 22a of the first internal electrode 18a, and a second external electrode 14b electrically connected to the second extended portion 22b thereof.

The first external electrode 14a covers not only the first extended portion 22a on the first side surface 12c, but also a portion of the first main surface 12a, the second main surface 12b, and the third side surface 12e. The second external electrode 14b covers not only the second extended portion 22b on the second side surface 12d, but also a portion of the first main surface 12a, the second main surface 12b, and the fourth side surface 12f.

The external electrode 15 includes a third external electrode 15a electrically connected to the third extended portion 24a of the second internal electrode 18b, and a fourth external electrode 15b electrically connected to the fourth extended portion 24b thereof.

The third external electrode 15a covers not only the third extended portion 24a on the first side surface 12c, but also a portion of the first main surface 12a, the second main surface 12b, and the fourth side surface 12f. The fourth external electrode 15b covers not only the fourth extended portion 24b on the second side surface 12d, but also a portion of the first main surface 12a, the second main surface 12b, and the third side surface 12e.

Figure 9A:
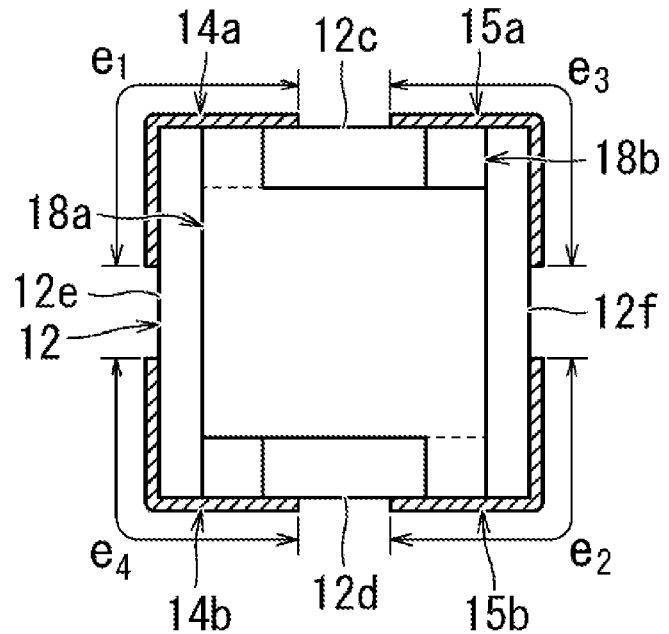
FIG. 9A illustrates dimensions of only external electrode portions of the multilayer ceramic capacitor in its circumferential direction.
Figure 9B:
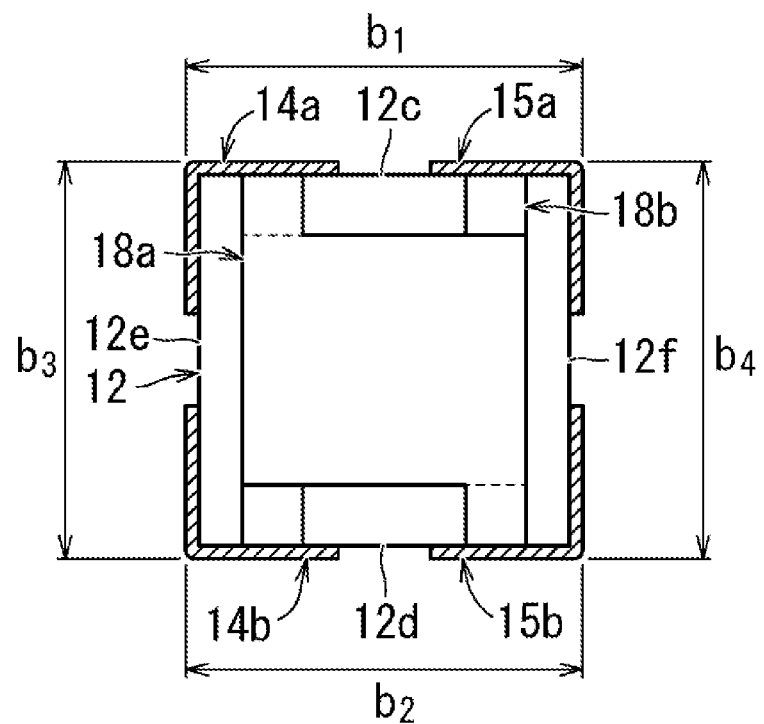
FIG. 9B illustrates dimensions of the multilayer ceramic capacitor in its circumferential direction.

The multilayer ceramic capacitor 10 has a total E of lengths ($=e_1+e_2+e_3+e_4$) of the external electrodes 14 and 15 disposed on the side surfaces 12c, 12d, 12e, and 12f of the laminate 12 at the center or approximate center of the multilayer ceramic capacitor 10 in the lamination direction x as illustrated in FIG. 9A, and an outer peripheral length B ($=b_1+b_2+b_3+b_4$) at the center or approximate center of the multilayer ceramic capacitor 10 in the laminated direction x as illustrated in FIG. 9B, a ratio E/B preferably being about 0.33 or more and about 0.83 or less, for example. In this case, a distance G between the external electrodes 14 and 15 adjacent to each other in the external electrodes 14 and 15 disposed on the second main surface 12b of the laminate 12 is preferably about 100 µm or more, for example, as illustrated in FIG. 6.

It is preferable that the external electrodes 14 and 15 are not disposed on the first main surface 12a of the laminate 12. This enables the multilayer ceramic capacitor 10 to be reduced in T dimension in the lamination direction x, so that the multilayer ceramic capacitor 10 with a further reduced thickness is obtained.

In addition, it is preferable to cover any one of short sides of a side surface to which the internal electrode 18 is not extended, and portions from opposite ends of the one short side to intermediate portions of each of the long sides, in a U-shape, with the corresponding one of the external electrodes 14 and 15 disposed on the third side surface 12e or the fourth side surface 12f, to which the internal electrode 18 is not extended, as illustrated in FIG. 8.

At this time, each of the external electrodes 14 and 15 disposed on the third side surface 12e or the fourth side surface 12f to which the internal electrode 18 is not extended, has a length β in the direction connecting short sides of the external electrode covering the center or approximate center in the lamination direction x of the short side of the side surface to which the internal electrode 18 is not extended, and a length α in the direction connecting opposite short sides of the external electrode covering the long side of the side surface to which the internal electrode 18 is not extended, a ratio β/α preferably being about 0.2 or more and less than about 1.0, and more preferably about 0.2 or more and about 0.5 or less, for example.

This enables a short circuit between external electrodes due to migration when the multilayer ceramic capacitor 10 is mounted on a substrate to be further prevented from occurring.

When the first opposed portion 20a and the second opposed portion 20b face each other with the dielectric layer 16 interposed therebetween in the laminate 12, electrical characteristics (e.g., electrostatic capacitance) are generated. Thus, electrostatic capacitance is obtained between the first external electrode 14a and the second external electrode 14b to which the first internal electrode 18a is connected, and the third external electrode 15a and the fourth external electrode 15b to which the second internal electrode 18b is connected. As a result, the multilayer ceramic capacitor 10 having the structure as described above defines and functions as a capacitor.

It is preferable that the external electrodes 14 and 15 each include the base electrode layer 28 and the plating layer 30 in order from its laminate 12 side.

The base electrode layer 28 includes a side surface base electrode layer 32, and a main surface base electrode layer 34.

The side surface base electrode layer 32 provided on each of the first side surface 12c, the second side surface 12d, the third side surface 12e, and the fourth side surface 12f is preferably a baked electrode layer, for example.

The baked electrode layer includes glass and metal. The metal of the baked electrode layer preferably includes at least one selected from Cu, Ni, Ag, Pd, Ag—Pd alloy, Au, for example.

The baked electrode layer may include a plurality of baked electrode layers. The baked electrode layer is formed by applying a conductive paste including glass and metal to the laminate 12 and baking the conductive paste. The baked electrode layer may be fired at the same time with the dielectric layer 16 and the internal electrode 18, or may be baked after the dielectric layer 16 and the internal electrode 18 are fired. The baked electrode layer preferably has a thickness (thickness in the direction orthogonal of substantially orthogonal to the lamination direction x, and the thickness of the thickest portion) of about 1 μm or more and about 6 μm or less, for example.

The main surface base electrode layer 34 provided on at least any one of the first main surface 12a and the second main surface 12b is a sputtering electrode formed by sputtering, for example.

The main surface base electrode layer 34 that is a sputtering electrode preferably includes Ni, Cr, and Cu, for example. The sputtering electrode preferably has an average thickness in the lamination direction x of about 50 nm or more and about 400 nm or less, and more preferably of about 50 nm or more and about 130 nm or less, for example. The main surface base electrode layer 34 provided on the first main surface 12a and the second main surface 12b may be a baked electrode layer, for example. In that case, the main surface base electrode layer 34 is formed by screen printing with an external electrode paste primarily including Ni, for example. The main surface baked electrode layer preferably has a thickness in the lamination direction x of about 1 μm or more and about 5 μm or less, for example.

The plating layer 30 preferably includes at least one selected from Ni, Sn, Cu, Ag, Pd, Ag—Pd alloy, Au, for example.

The plating layer 30 may include a plurality of plating layers. When a multilayer ceramic capacitor is mounted on a substrate surface, a two-layer structure of Ni plating and Sn plating, for example, is preferable. The Ni plating layer prevents the base electrode layer 28 from being eroded by solder used when the multilayer ceramic capacitor 10 is mounted. The Sn plating layer improves wettability of solder when the multilayer ceramic capacitor 10 is mounted to facilitate the mounting thereof. A Cu plating layer may be provided between the base electrode layer 28 and the Ni plating layer.

When a multilayer ceramic capacitor is mounted by being embedded in a substrate, a single layer structure of Cu plating is preferably provided.

The Ni plating layer preferably has an average thickness of about 2 μm or more and about 4 μm or less, for example. The Sn plating layer preferably has an average thickness of about 2 μm or more and about 4 μm or less, for example. The Cu plating layer preferably has an average thickness of about 5 μm or more and about 8 μm or less.

The multilayer ceramic capacitor 10 has a dimension in the length direction y, being indicated as a dimension L. The multilayer ceramic capacitor 10 including the laminate 12, and the external electrodes 14 and 15, has a dimension in the lamination direction x, being indicated as a dimension T, and a dimension in the width direction z, being indicated as a dimension W.

Comparing the dimension L of the multilayer ceramic capacitor 10 in the longitudinal direction y and the dimension W thereof in the width direction z, the following relationship is preferably satisfied: about $0.85 \leq W/L \leq$ about 1, and $L \leq$ about 750 μm. The dimension L larger than the above value reduces deflective strength.

In addition, the dimension T of the multilayer ceramic capacitor 10 in the lamination direction x satisfies about 70 μm $\leq T \leq$ about 110 μm. The dimension T less than about 70 μm is not preferable because it causes warping of the laminate at the time of firing to increase, which reduces deflective strength. The dimension T more than about 110 μm is not preferable as a thin multilayer ceramic capacitor.

When the internal electrode 18 is extended to at least one of the first side surface 12c and the second side surface 12d, there is a distance between adjacent external electrodes 14 and 15 disposed on the side surface with the internal electrode 18 extended, such as a distance $g_1$ between the first external electrode 14a and the third external electrode 15a, or a distance $g_1$ between the second external electrode 14b and the fourth external electrode 15b, as illustrated in FIG. 7. The distance $g_1$ and the dimension W of the multilayer ceramic capacitor 10 in the width direction z preferably satisfy $g_1/W \leq$ about 0.42.

When an internal electrode 18 is extended to at least one of the third side surface 12e and the fourth side surface 12f, a distance $g_2$ between adjacent external electrodes 14 and 15 disposed on the side surface with the internal electrode 18 extended and the dimension L of the multilayer ceramic capacitor 10 in the longitudinal direction y preferably satisfy $g_2/L \leq$ about 0.42.

When an internal electrode 18 is extended to at least one of the first side surface 12c and the second side surface 12d, and an internal electrode 18 is extended to at least one of the third side surface 12e and the fourth side surface 12f, there are a distance between adjacent external electrodes 14 and 15 disposed on the at least one of the first side surface 12c and the second side surface 12d, to which the internal electrode 18 is extended, being indicated as $g_1$, and a distance between adjacent external electrodes 14 and 15 disposed on the at least one of the third side surface 12e and the fourth side surface 12f, to which the internal electrode 18 is extended, being indicated as $g_2$. The distances $g_1$ and $g_2$ preferably satisfy $g_1/W \leq$ about 0.42 and $g_2/L \leq$ about 0.42.

When the relationship between the distance between external electrodes 14 and 15, and the dimension W of the multilayer ceramic capacitor 10 in the width direction z has the above-described relationship, a reduction of equivalent series inductance (ESL) as a parasitic component of the multilayer ceramic capacitor is able to be obtained.

In the multilayer ceramic capacitor 10 illustrated in FIG. 1, the dimension L of the multilayer ceramic capacitor 10 in the length direction y and the dimension W thereof in the width direction z preferably satisfy $0.85 \leq W/L \leq$ about 1, and $L \leq$ about 750 μm, the dimension T of the multilayer ceramic capacitor 10 in the lamination direction x preferably satisfies the following relationship: about 70 μm $\leq T \leq$ about 110 μm, and a dimension of the laminate 12 in the lamination direction x, being indicated as t, and a dimension of the effective layer 16b in the lamination direction, x being indicated as t', preferably satisfy $t'/t \geq$ about 0.55. This enables a multilayer ceramic capacitor 10 capable of ensuring deflective strength even when being reduced in thickness to be obtained.

In the multilayer ceramic capacitor 10 illustrated in FIG. 1, the first extended portion 22a of the first internal electrode 18a and the fourth extended portion 24b of the second internal electrode 18b are extended to positions facing each other, and the second extended portion 22b of the first internal electrode 18a and the third extended portion 24a of the second internal electrode 18b are extended to positions facing each other, in the side surfaces 12c, 12d, 12e, and 12f of the laminate 12. This causes currents flowing through respective extended portions to flow in directions opposite to each other when voltage is applied, so that a reduction of equivalent series inductance (ESL) as a parasitic component of the multilayer ceramic capacitor is able to be obtained.

In addition, the multilayer ceramic capacitor 10 illustrated in FIG. 1 has a total E of lengths ($=e_1+e_2+e_3+e_4$) of external electrodes 14 and 15 disposed on the side surfaces 12c, 12d, 12e, and 12f of the laminate 12 at a position of ½ of the multilayer ceramic capacitor 10 in the lamination direction x, and an outer peripheral length B ($=b_1+b_2+b_3+b_4$) at the center or approximate center of the multilayer ceramic capacitor 10 in the laminated direction x, a ratio E/B is preferably about 0.33 or more and about 0.83 or less, for example. When the distance G between adjacent external electrodes 14 and 15 of external electrodes 14 and 15 disposed on the second main surface 12b of the laminate 12 is about 100 μm or more, a short circuit between external electrodes due to migration when the multilayer ceramic capacitor 10 is mounted on a substrate is prevented from occurring and bonding strength at the time of mounting is maintained.

Next, a non-limiting example of a method for manufacturing the multilayer ceramic capacitor 10 will be described.

First, a ceramic green sheet and a conductive paste for an internal electrode are prepared. The ceramic green sheet and the conductive paste for an internal electrode each include a binder (e.g., a known organic binder, etc.) and a solvent (e.g., an organic solvent, etc.).

Figure 10A:
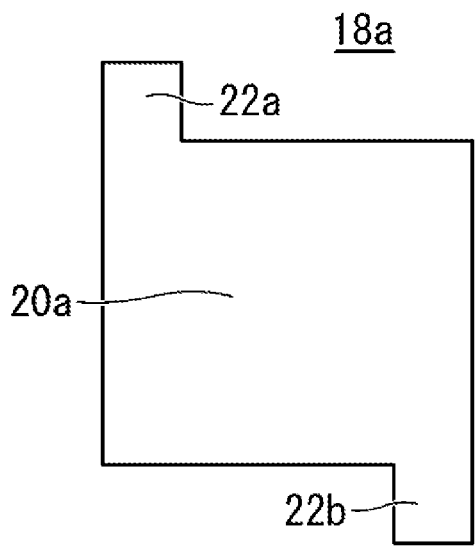
FIG. 10A illustrates a first internal electrode pattern of the multilayer ceramic capacitor illustrated in FIG. 1.
Figure 10B:
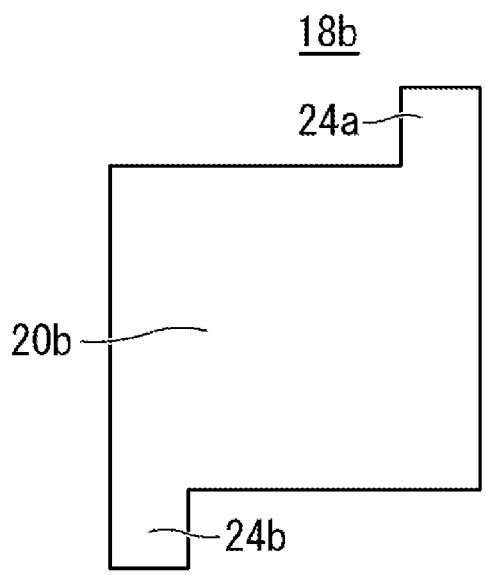
FIG. 10B illustrates a second internal electrode pattern thereof.

Next, the conductive paste is applied to the ceramic green sheet in a predetermined pattern by gravure printing, for example, to form an internal electrode pattern as illustrated in FIGS. 10A and 10B. Specifically, a conductive paste layer is formed by applying a paste made of a conductive material to the ceramic green sheet by a method, such as gravure printing, for example. The paste made of a conductive material is acquired by adding an organic binder and an organic solvent to metal powder, for example. Then, a ceramic green sheet for an outer layer on which the internal electrode pattern is not printed is also produced.

The ceramic green sheets on which the corresponding internal electrode patterns are formed are used to produce a laminated sheet. That is, the laminated sheet is produced as follows: a ceramic green sheet with no internal electrode pattern is laminated; a ceramic green sheet with an internal electrode pattern corresponding to the first internal electrode 18a as illustrated in FIG. 10A and a ceramic green sheet with an internal electrode pattern corresponding to the second internal electrode 18b as illustrated in FIG. 10B are alternately laminated thereon, and a ceramic green sheet with no internal electrode pattern is further laminated. Subsequently, the laminated sheet is pressure-bonded in the lamination direction x by, for example, an isostatic press or other suitable press to produce a laminated block.

The laminated sheet is further pressed in the lamination direction by, for example, an isostatic press or other suitable press to produce a laminated block.

Subsequently, the laminated block is cut into a predetermined size to produce a laminated chip. At this time, barrel polishing or other suitable polishing may be applied to the laminated chip to round corners and ridgeline portions thereof.

Figure 11:
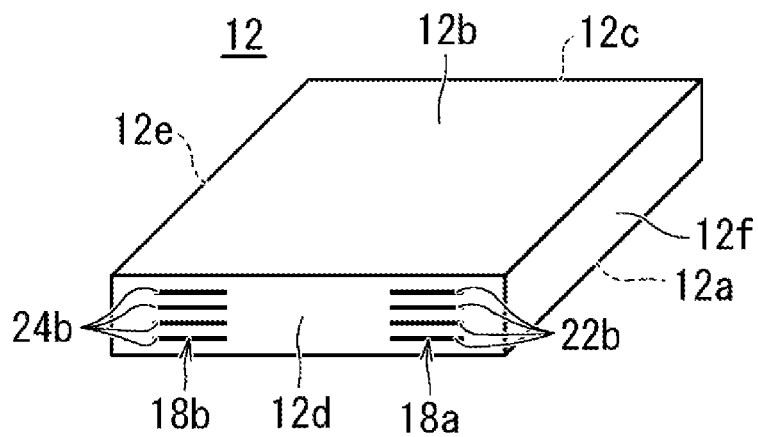
FIG. 11 is an external perspective view of a laminate of the multilayer ceramic capacitor of FIG. 1.

Next, the laminated chip is fired to produce the laminate 12 as illustrated in FIG. 11. The firing temperature is preferably about 900° C. or higher and about 1300° C. or lower, for example, depending on material of the ceramic and the internal electrode.

As illustrated in FIG. 11, the first extended portion 22a of the first internal electrode 18a and the third extended portion 24a of the second internal electrode 18b are exposed from the first side surface 12c of the laminate 12. In addition, the second extended portion 22b of the first internal electrode 18a and the fourth extended portion 24b of the second internal electrode 18b are exposed from the second main surface 12d of the laminate 12.

Subsequently, the external electrodes 14 and 15 are formed on the laminate 12.

Figure 12:
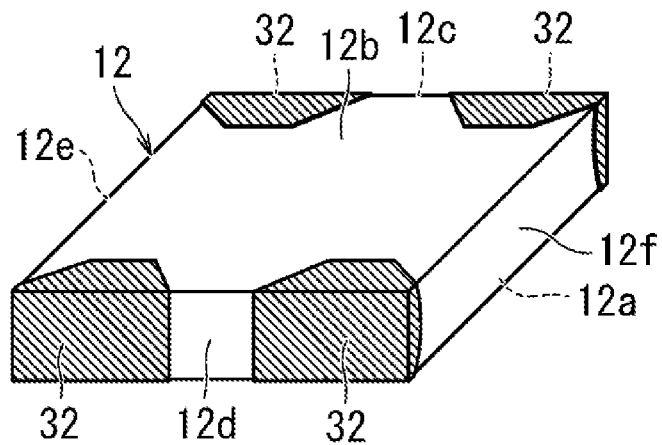
FIG. 12 is an external perspective view in which a base electrode layer for a side surface is provided on the laminate illustrated in FIG. 11.

That is, as illustrated in FIG. 12, a paste for an external electrode, primarily including Ni, is applied to the first side surface 12c of the laminate 12 by roller copying so as to cover the first extended portion 22a of the first internal electrode 18a exposed from the first side surface 12c, while being applied so as to wrap around a portion of the first main surface 12a, the second main surface 12b, and the third side surface 12e. The paste for an external electrode, primarily including Ni, is also applied to the first side surface 12c of the laminate 12 by the roller copying so as to cover the third extended portion 24a of the second internal electrode 18b exposed from the first side surface 12c, while being applied so as to wrap around a portion of the first main surface 12a, the second main surface 12b, and the fourth side surface 12f.

Similarly, the paste for an external electrode, primarily including Ni, is also applied to the second side surface 12d of the laminate 12 by the roller copying so as to cover the second extended portion 22b of the first internal electrode 18a exposed from the second side surface 12d, while being applied so as to wrap around a portion of the first main surface 12a, the second main surface 12b, and the fourth side surface 12f. In addition, the paste for an external electrode, primarily including Ni, is applied to the second side surface 12d of the laminate 12 by the roller copying so as to cover the fourth extended portion 24b of the second internal electrode 18b exposed from the second side surface 12d, while being applied so as to wrap around a portion of the first main surface 12a, the second main surface 12b, and the third side surface 12e.

Then, firing to bake the paste for an external electrode is performed to form a base electrode layer 32 on a side surface, defining a base electrode layer 28.

Figure 13:
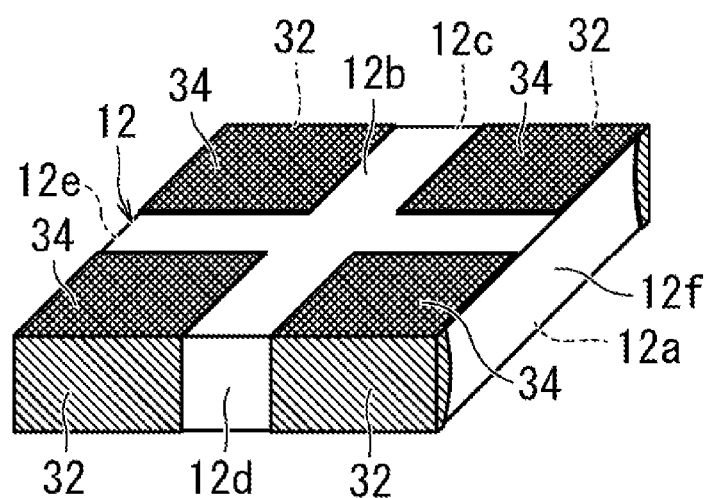
FIG. 13 is an external perspective view in which a base electrode layer for a main surface is provided on the laminate having the base electrode layer for a side surface illustrated in FIG. 12.

Subsequently, as illustrated in FIG. 13, a main surface base electrode layer, primarily including Ni/Cr alloy, is formed by sputtering, for example, to form a portion of the base electrode layer 34 on a main surface so as to extend from the side surface base electrode layer 32, formed so as to cover the first extended portion 22a of the first internal electrode 18a, to the first main surface 12a and the second main surface 12b. In addition, the main surface base electrode layer, primarily including Ni/Cr alloy, is formed by sputtering, for example, to form a portion of the base electrode layer 34 on a main surface so as to extend from the base electrode layer 32 on a side surface, formed so as to cover the third extended portion 24a of the second internal electrode 18b, to the first main surface 12a and the second main surface 12b. At this time, the base electrode layer for a main surface does not substantially wrap around the side surface.

Similarly, the main surface base electrode layer, primarily including Ni/Cr alloy, is formed by sputtering, for example, to form a portion of the base electrode layer 34 on a main surface so as to extend from the side surface base electrode layer 32, formed so as to cover the second extended portion 22b of the first internal electrode 18a, to the first main surface 12a and the second main surface 12b. In addition, the main surface base electrode layer, primarily including Ni/Cr alloy, is formed by sputtering, for example, to form a portion of the base electrode layer 34 on a main surface so as to extend from the side surface base electrode layer 32, formed so as to cover the fourth extended portion 24b of the second internal electrode 18b, to the first main surface 12a and the second main surface 12b. At this time, the main surface base electrode layer does not substantially wrap around the side surface.

Further, a main surface base electrode layer, primarily including Ni/Cu alloy, is formed by sputtering, for example, on a surface of the base electrode layer on a main surface, primarily including Ni/Cr alloy, formed so as to cover the first extended portion 22a of the first internal electrode 18a as the base electrode layer 34 to a main surface. In addition, the main surface base electrode layer, primarily including Ni/Cu alloy, is also formed by sputtering, for example, on a surface of the base electrode layer on a main surface, primarily including Ni/Cr alloy, formed so as to cover the third extended portion 24a of the second internal electrode 18b as the main surface base electrode layer 34. At this time, the main surface base electrode layer does not substantially wrap around the side surface.

Similarly, the main surface base electrode layer, primarily including Ni/Cu alloy, is formed by sputtering, for example, on a surface of the base electrode layer on a main surface, primarily including Ni/Cr alloy, formed so as to cover the second extended portion 22b of the first internal electrode 18a as the main surface base electrode layer 34. In addition, the main surface base electrode layer, primarily including Ni/Cu alloy, is also formed by sputtering, for example, on a surface of the base electrode layer 28 on a main surface, primarily including Ni/Cr alloy, formed so as to cover the fourth extended portion 24b of the second internal electrode 18b as the base electrode layer 34 on a main surface. At this time, the main surface base electrode layer does not substantially wrap around the side surface.

Then, a plating layer 30 is formed so as to cover a surface of each of the base electrode layer 32 on a side surface and the base electrode layer 34 on a main surface. At this time, preferably, a Cu plating layer is formed on the plating layer 30, a Ni plating layer is formed on a surface of the Cu plating layer, and a Sn plating layer is formed on a surface of the Ni plating layer, for example.

The plating layer 30 causes the external electrodes 14 and 15 disposed on a side surface to which no internal electrode 18 is extended to cover the corresponding opposite short sides of the side surface to which no internal electrode 18 is extended and portions from ends of the corresponding opposite short sides to intermediate portions of respective opposite long sides, in a U-shape.

As described above, the multilayer ceramic capacitor 10, as illustrated in FIG. 1, is manufactured.

Second Preferred Embodiment

Figure 14:
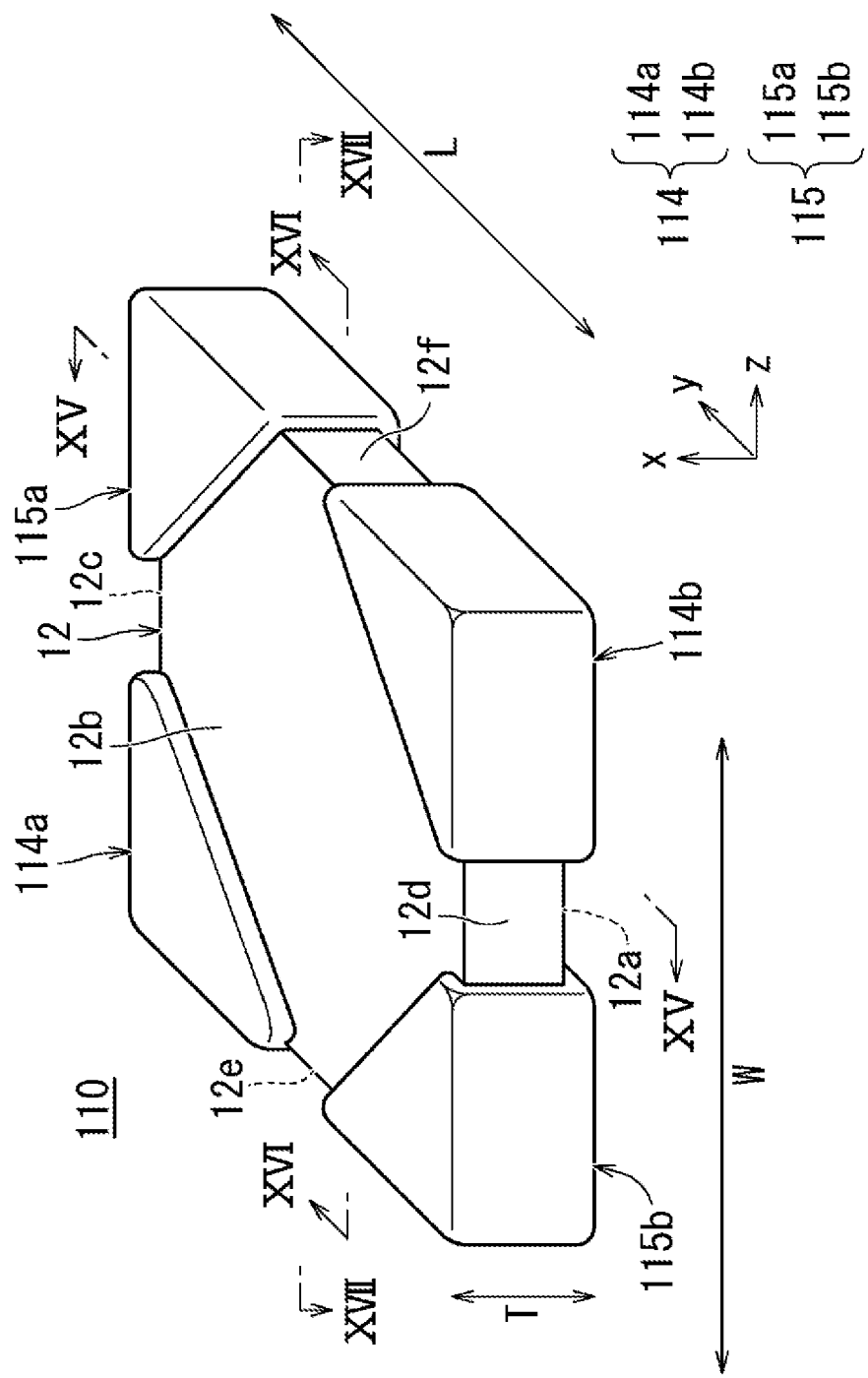
FIG. 14 is an external perspective view illustrating a second preferred embodiment of a multilayer ceramic capacitor according to the present invention.
Figure 15:
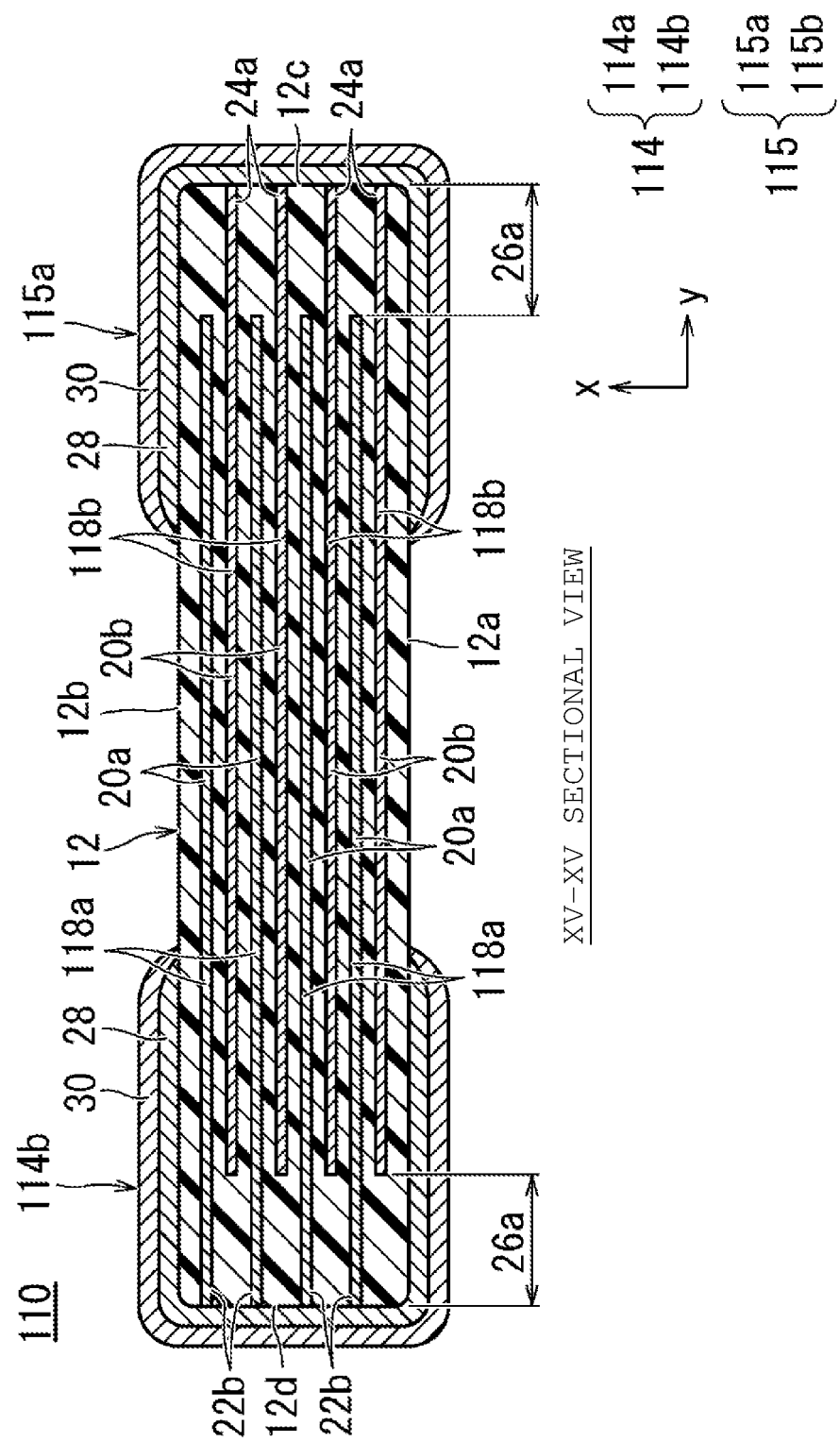
FIG. 15 is a sectional view of the multilayer ceramic capacitor illustrated in FIG. 14, taken along line XV-XV.
Figure 16:
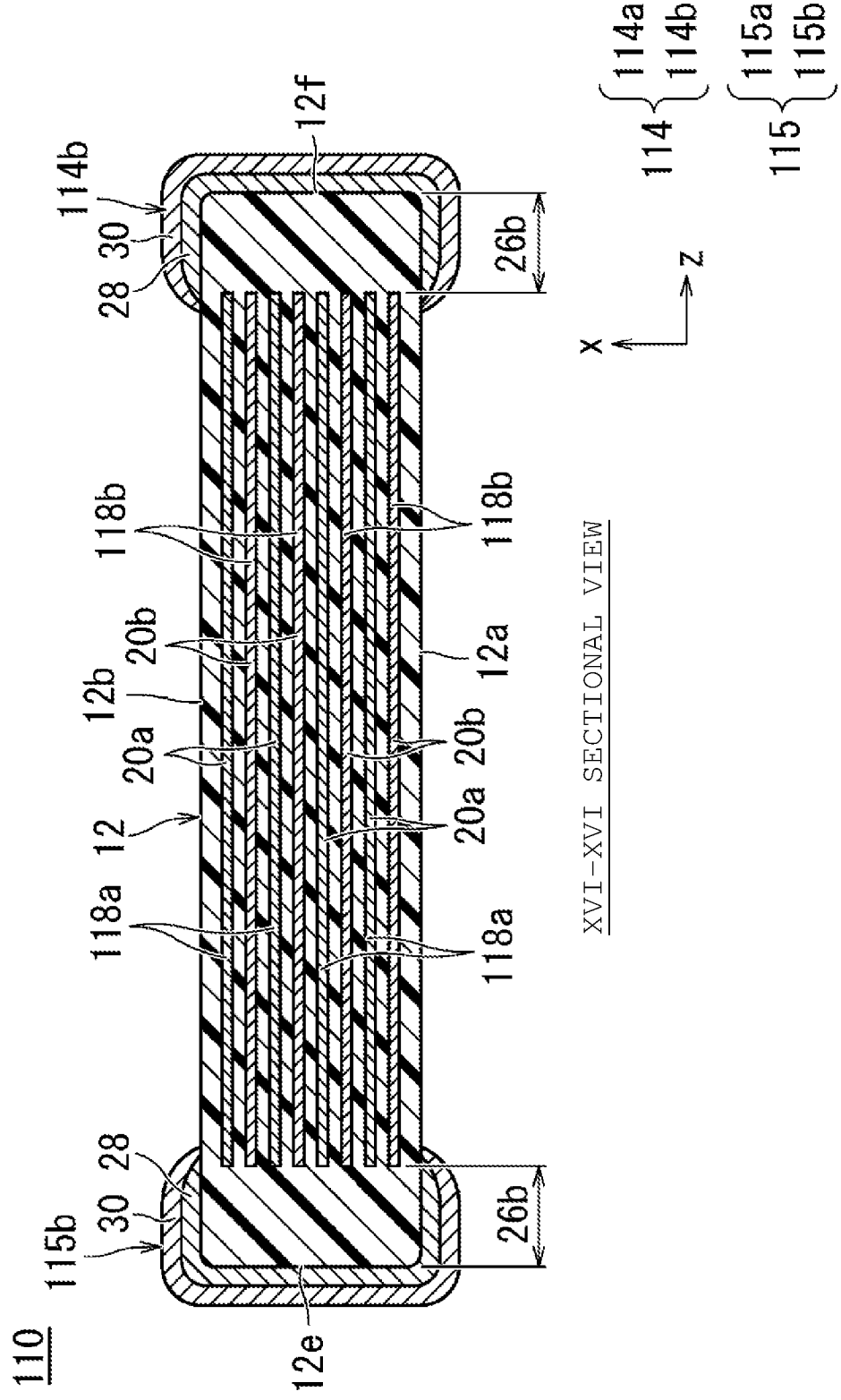
FIG. 16 is a sectional view of the multilayer ceramic capacitor illustrated in FIG. 14, taken along line XVI-XVI.
Figure 17:
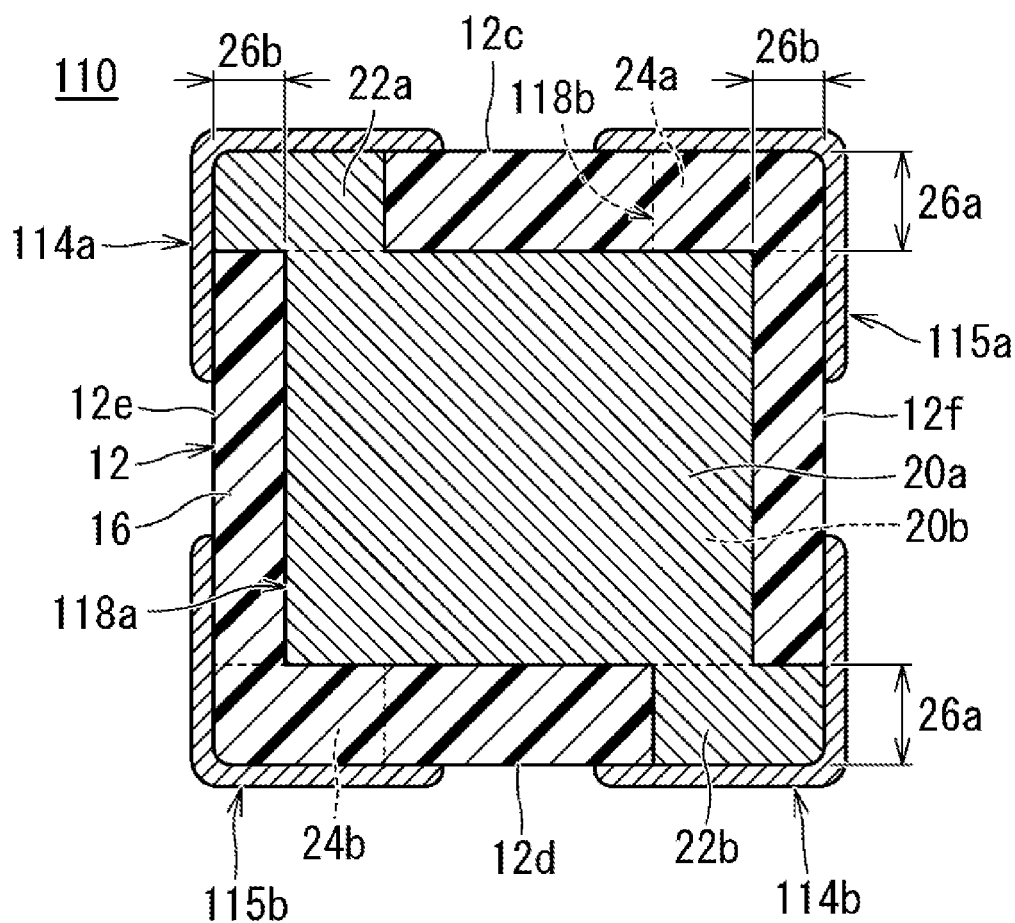
FIG. 17 is a sectional view of the multilayer ceramic capacitor illustrated in FIG. 14, taken along line XVII-XVII.
Figure 18:
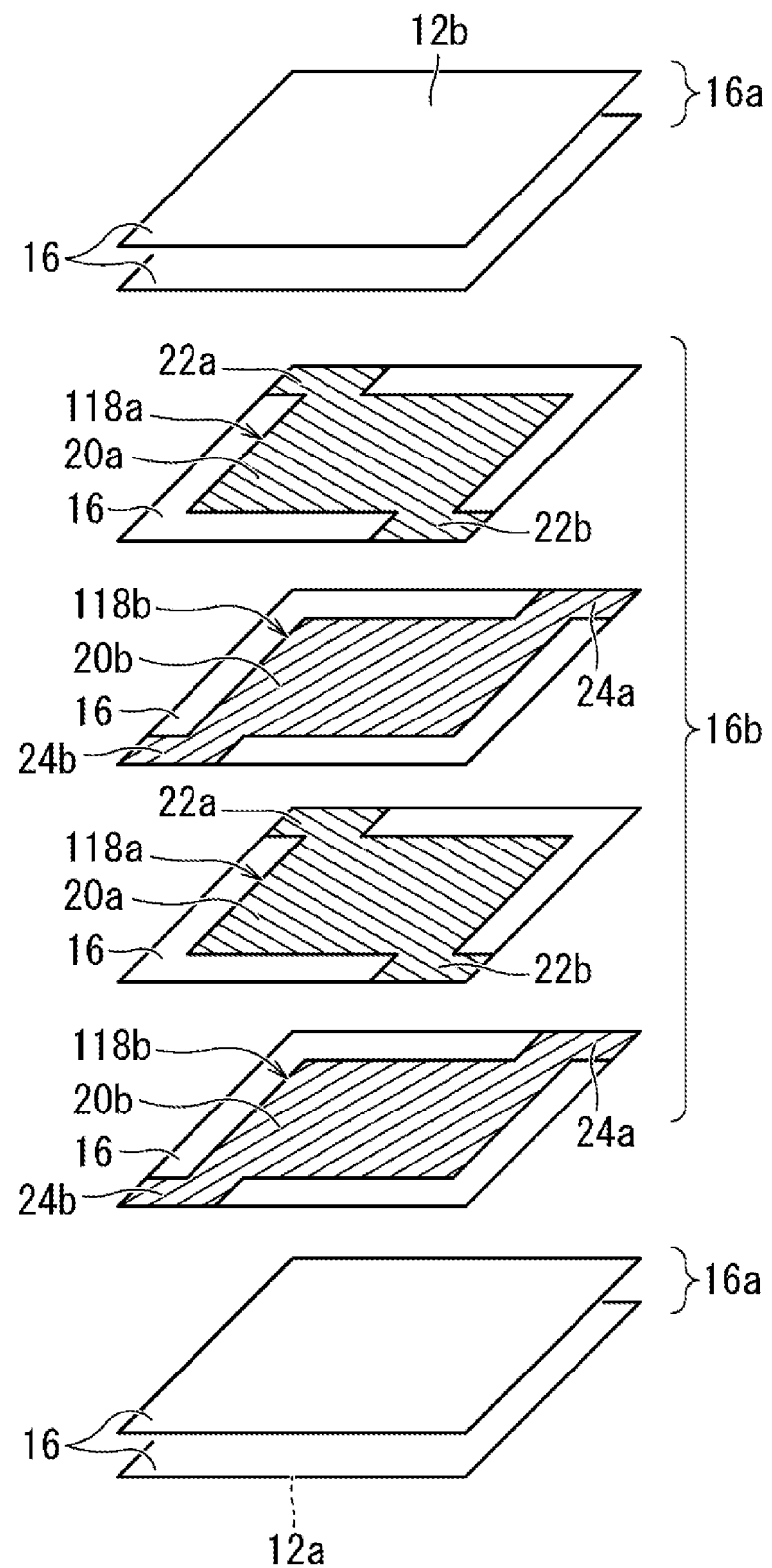
FIG. 18 is an exploded perspective view of the laminate illustrated in FIGS. 14 to 17.

Next, a multilayer ceramic capacitor according to a second preferred embodiment of the present invention will be described. FIG. 14 is an external perspective view illustrating the second preferred embodiment of the multilayer ceramic capacitor according to the present invention, and FIG. 15 is a sectional view of the multilayer ceramic capacitor illustrated in FIG. 14, taken along line XV-XV. FIG. 16 is a sectional view of the multilayer ceramic capacitor illustrated in FIG. 14, taken along line XVI-XVI. FIG. 17 is a sectional view of the multilayer ceramic capacitor illustrated in FIG. 14, taken along line XVII-XVII. FIG. 18 is an exploded perspective view of the laminate illustrated in FIGS. 14 to 17. In a multilayer ceramic capacitor 110 illustrated in FIGS. 14 to 18, the same portions as those of the multilayer ceramic capacitor 10 illustrated in FIGS. 1 to 5 are denoted by the same reference numerals, and description thereof is omitted.

The multilayer ceramic capacitor 110 illustrated in FIGS. 14 to 18 is different from the multilayer ceramic capacitor 10 illustrated in FIGS. 1 to 5 in that an internal electrode 118 is extended to not only a first side surface 12c and a second side surface 12d, but also a third side surface 12e and a fourth side surface 12f.

The multilayer ceramic capacitor 110 includes a laminate 12 having a rectangular or substantially rectangular parallelepiped shape, and external electrodes 14 and 15.

The laminate 12 includes a plurality of dielectric layers 16 and a plurality of internal electrodes 118.

In the multilayer ceramic capacitor 110, the internal electrodes 118 are alternately laminated with the dielectric layer 16 interposed therebetween in the laminate 12, as illustrated in FIGS. 14 to 18.

The laminate 12 includes a plurality of first internal electrodes 118a and a plurality of second internal electrodes 118b as the plurality of internal electrodes 118. The first inner electrode 118a and the second inner electrode 118b are alternately laminated with the dielectric layer 16 interposed therebetween.

The first internal electrode 118a is disposed on a surface of the dielectric layer 16. The first inner electrode 118a includes a first opposed portion 20a facing the first main surface 12a and the second main surface 12b, and is laminated in a direction connecting the first main surface 12a and the second main surface 12b.

The second internal electrode 118b is disposed on a surface of the dielectric layer 16 different from the dielectric layer 16 on which the first internal electrode 118a is disposed. The second internal electrode 118b includes a second opposed portion 20b facing the first main surface 12a and the second main surface 12b, and is laminated in the direction connecting the first main surface 12a and the second main surface 12b.

The first internal electrode 118a extends to the first side surface 12c and the third side surface 12e of the laminate 12 by the first extended portion 22a, and extends to the second side surface 12d and the fourth side surface 12f of the laminate 12 by the second extended portion 22b. That is, the first extended portion 22a extends to the third side surface 12e of the laminate 12, and the second extended portion 22b extends to the fourth side surface 12f of the laminate 12.

The second internal electrode 118b extends to the first side surface 12c and the fourth side surface 12f of the laminate 12 by the third extended portion 24a, and extends to the second side surface 12d and the third side surface 12e of the laminate 12 by the fourth extended portion 24b. That is, the second extended portion 24a extends to the fourth side surface 12f of the laminate 12, and the fourth extended portion 24b extends to the third side surface 12e of the laminate 12.

External electrodes 114 and 115 are provided on the laminate 12.

The external electrode 114 includes a first external electrode 114a electrically connected to the first extended portion 22a of the first internal electrode 118a, and a second external electrode 114b electrically connected to the second extended portion 22b thereof.

The first external electrode 114a covers not only the first extended portion 22a on the first side surface 12c and the third side surface 12e, but also a portion of the first main surface 12a and the second main surface 12b. The second external electrode 114b covers not only the second extended portion 22b on the second side surface 12d and the fourth side surface 12f, but also a portion of the first main surface 12a and the second main surface 12b.

The external electrode 115 includes a third external electrode 115a electrically connected to the third extended portion 24a of the second internal electrode 118b, and a fourth external electrode 115b electrically connected to the fourth extended portion 24b thereof.

The third external electrode 115a covers not only the third extended portion 24a on the first side surface 12c and the fourth side surface 12f, but also a portion of the first main surface 12a and the second main surface 12b. The fourth external electrode 115b covers not only the fourth extended portion 24b on the second side surface 12d and the third side surface 12e, but also a portion of the first main surface 12a and the second main surface 12b.

It is preferable that the external electrodes 114 and 115 each include the base electrode layer and the plating layer in order from a laminate 12 side.

The multilayer ceramic capacitor 110 illustrated in FIG. 14 achieves advantageous effects that are similar to those of the multilayer ceramic capacitor 10 described above.

Next, a non-limiting example of a method for manufacturing the multilayer ceramic capacitor 110 will be described.

First, a ceramic green sheet and a conductive paste for an internal electrode are prepared. The ceramic green sheet and the conductive paste for an internal electrode each include a binder (e.g., a known organic binder, etc.) and a solvent (e.g., an organic solvent, etc.).

Next, the conductive paste is applied to the ceramic green sheet in a predetermined pattern by gravure printing, for example, to form an internal electrode pattern as illustrated in FIG. 19. Specifically, a conductive paste layer is formed by applying a paste made of a conductive material to the ceramic green sheet by a method, such as a gravure method, for example. The paste made of a conductive material is acquired by adding an organic binder and an organic solvent to metal powder, for example. Then, a ceramic green sheet for an outer layer on which the internal electrode pattern is not printed is also produced.

The ceramic green sheets on which the corresponding internal electrode patterns are formed are used to produce a laminated sheet. That is, the laminated sheet is produced as follows: a ceramic green sheet with no internal electrode pattern is laminated; a ceramic green sheet with an internal electrode pattern corresponding to the first internal electrode 18a as illustrated in FIG. 19A and a ceramic green sheet with an internal electrode pattern corresponding to the second internal electrode 18b as illustrated in FIG. 19B are alternately laminated thereon; and a ceramic green sheet with no internal electrode pattern is further laminated. Subsequently, the laminated sheet is pressure-bonded in the lamination direction x by, for example, isostatic press or other suitable press to produce a laminated block.

The laminated sheet is further pressed in the lamination direction by, for example, isostatic press or other suitable press to produce a laminated block.

Subsequently, the laminated block is cut into a predetermined size to produce a laminated chip. At this time, barrel polishing or other suitable polishing may be applied to the laminated chip to round corners and ridgeline portions thereof.

Next, the laminated chip is fired to produce the laminate 12 as illustrated in FIG. 20. The firing temperature is preferably about 900° C. or higher and about 1300° C. or lower, depending on material of the ceramic and the internal electrode.

At this time, as illustrated in FIG. 20, the first extended portion 22a of the first internal electrode 18a is exposed from the first side surface 12c and the third side surface 12e of the laminate 12, and the third extended portion 24a of the second internal electrode 18b is exposed from the first side surface 12c and the fourth side surface 12f of the laminate 12. In addition, the second extended portion 22b of the first internal electrode 18a is exposed from the second side surface 12d and the fourth side surface 12f of the laminate 12, and the fourth extended portion 24b of the second internal electrode 18b is exposed from the second side surface 12d and the third side surface 12e of the laminate 12.

Subsequently, the external electrodes 114 and 115 are formed on the laminate 12.

That is, as illustrated in FIG. 21A, the laminate 12 is held such that a short side to which side surfaces of the laminate 12 are connected faces downward, and is dipped into an external electrode paste tank 42 filled with an external electrode paste 40 primarily including Ni so that the external electrode paste 40 is applied to the laminate 12. Then the laminate 12 is baked to form base electrode layers 28 on the side surfaces and main surfaces as illustrated in FIG. 21B. Similarly, the dipping is performed on other three short sides to which the corresponding side surfaces of the laminate 12 are connected, so that the base electrode layers 28 are formed at four locations in total as illustrated in FIG. 22. In that case, the base electrode layer 28 on each main surface preferably has a thickness, for example, of about 1 µm or more and about 5 µm or less in the lamination direction x.

Then, a plating layer 30 is formed so as to cover each of the base electrode layers 28. At this time, preferably, a Cu plating layer is formed on the plating layer 30, a Ni plating layer is formed on a surface of the Cu plating layer, and a Sn plating layer is formed on a surface of the Ni plating layer, for example.

As described above, the multilayer ceramic capacitor 110, as illustrated in FIG. 14, is manufactured.

Third Preferred Embodiment

Figure 23:
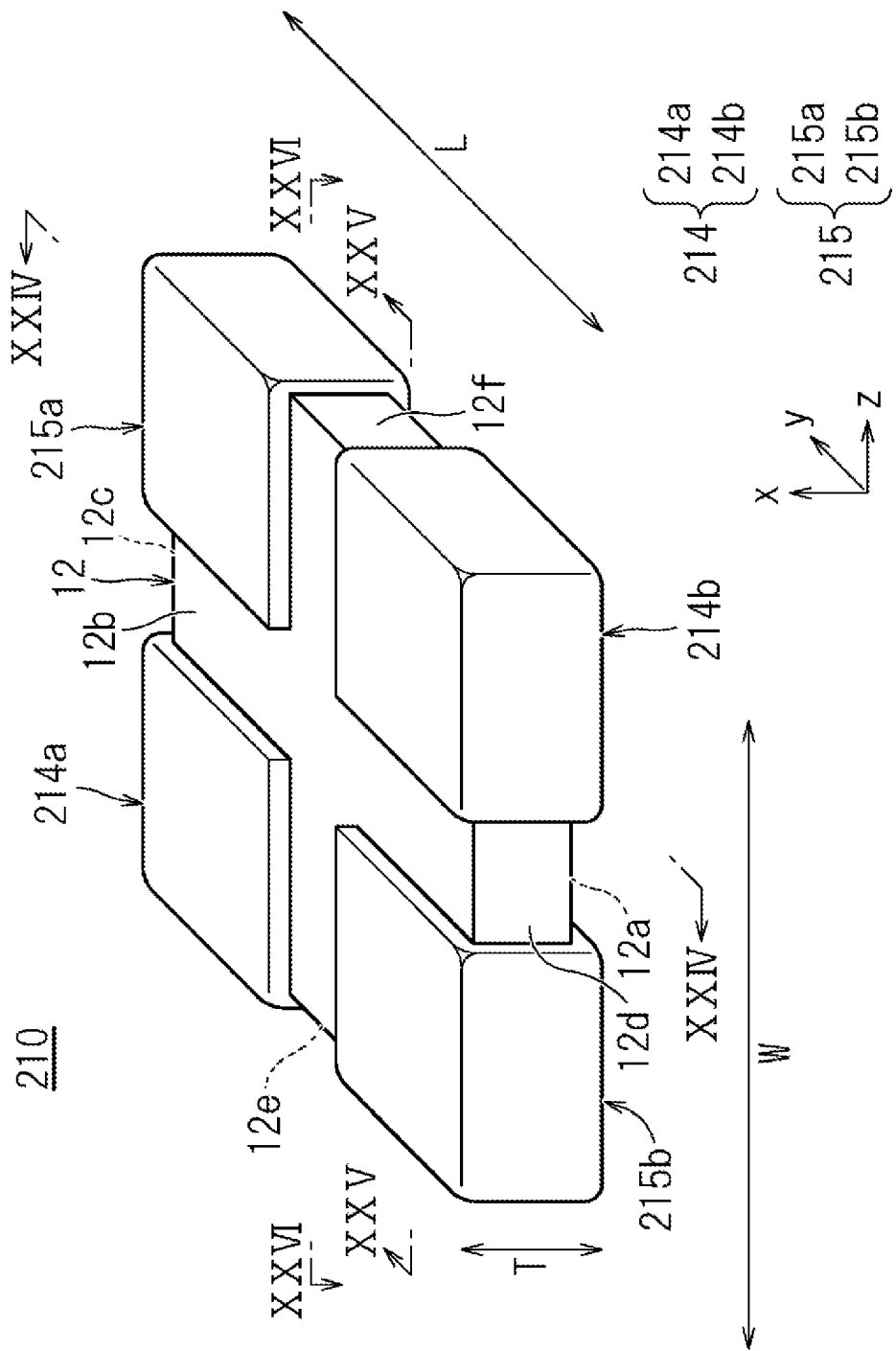
FIG. 23 is an external perspective view illustrating a third preferred embodiment of a multilayer ceramic capacitor according to the present invention.
Figure 24:
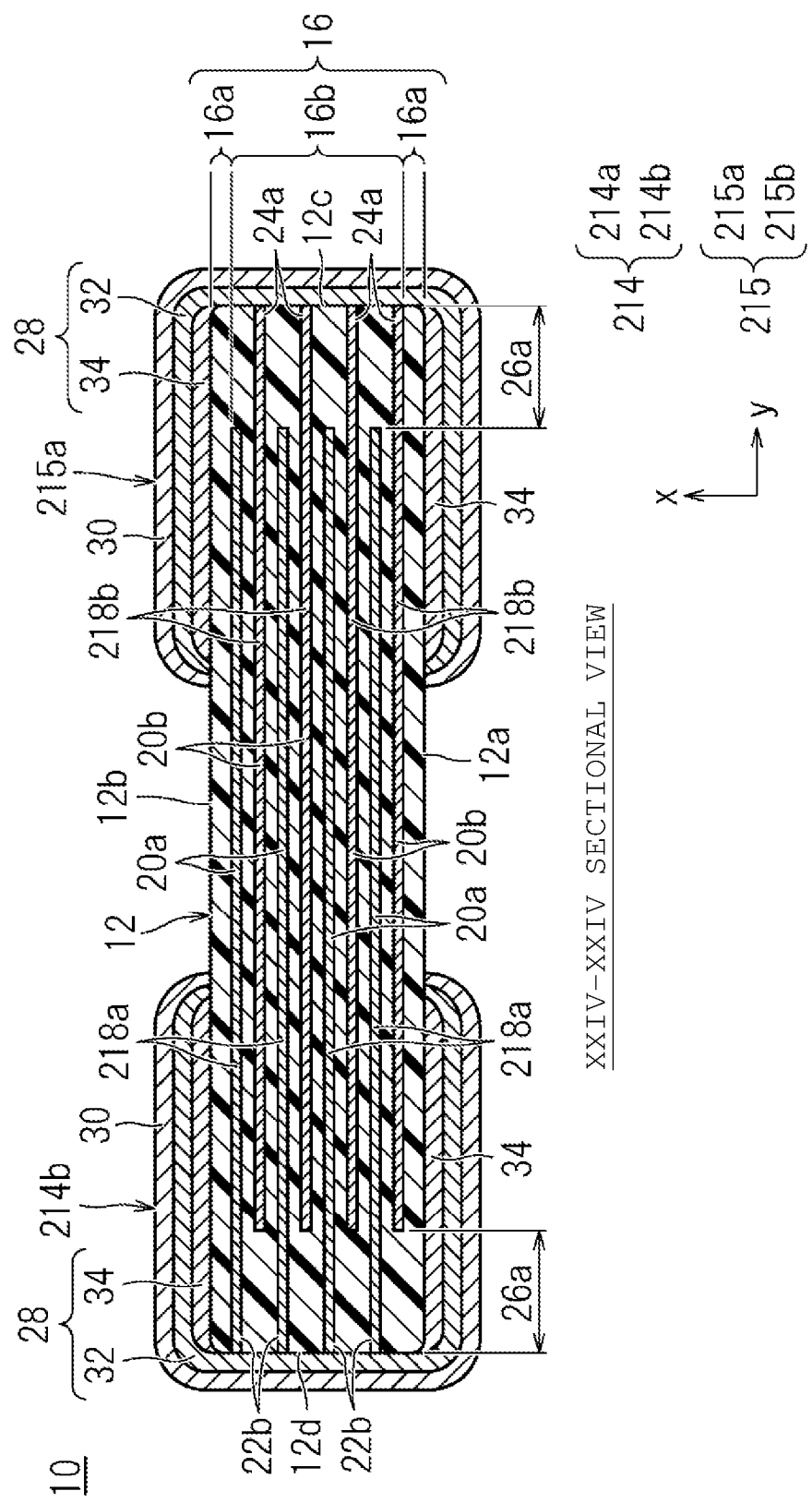
FIG. 24 is a sectional view of the multilayer ceramic capacitor illustrated in FIG. 23, taken along line XXIV-XXIV.
Figure 25:
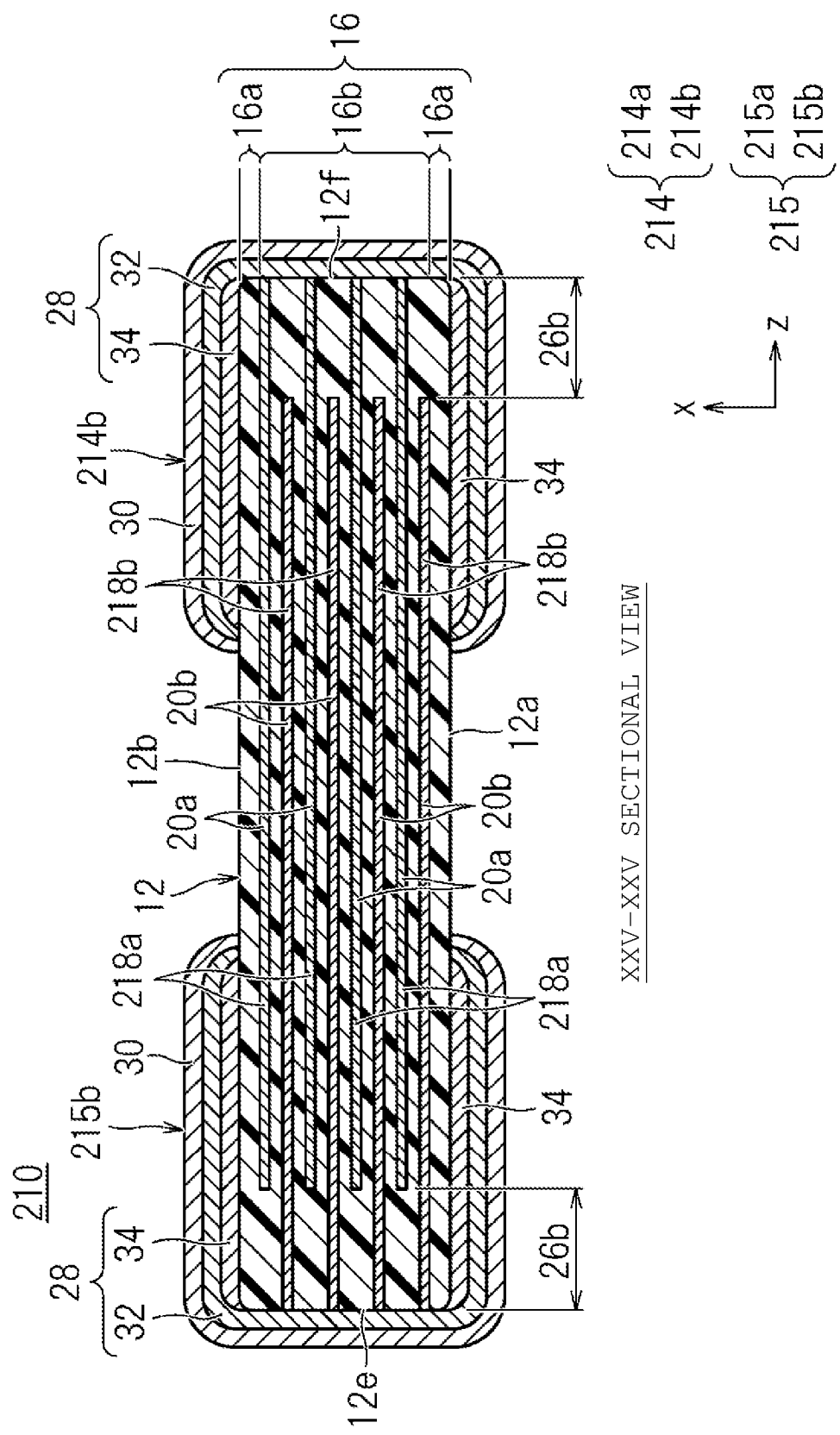
FIG. 25 is a sectional view of the multilayer ceramic capacitor illustrated in FIG. 23, taken along line XXV-XXV.
Figure 26:
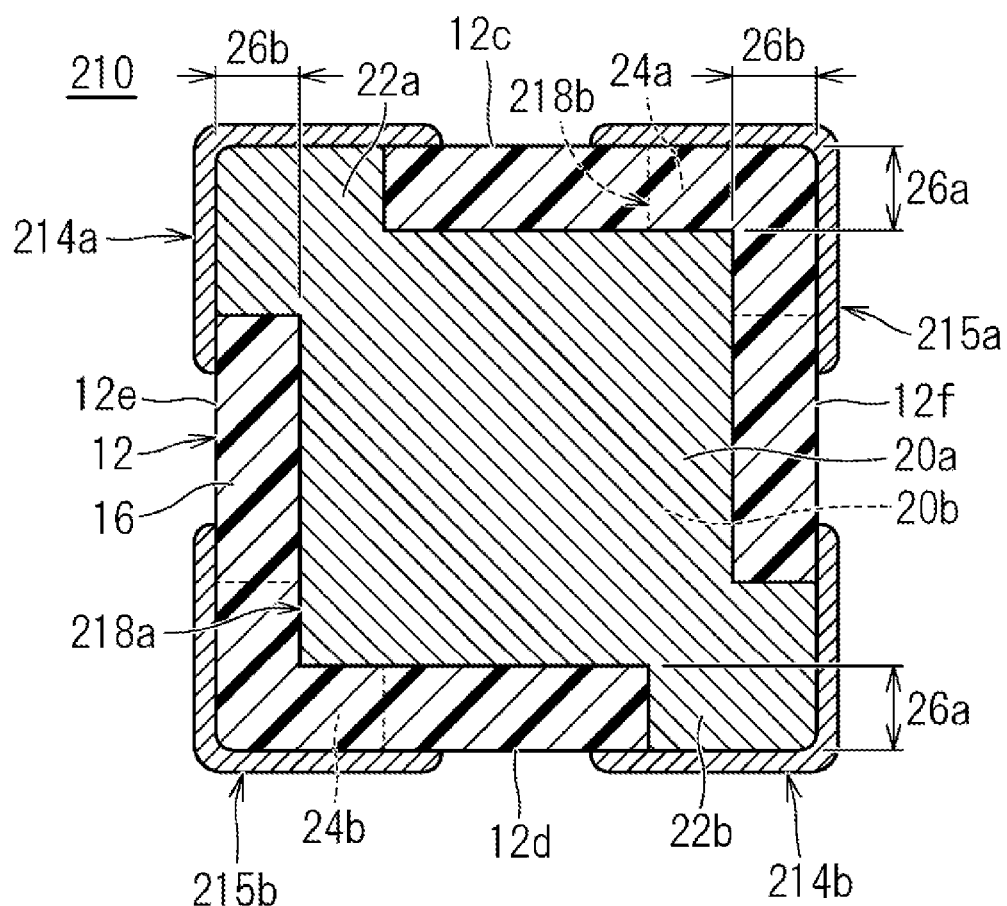
FIG. 26 is a sectional view of the multilayer ceramic capacitor illustrated in FIG. 23, taken along line XXVI-XXVI.
Figure 27:
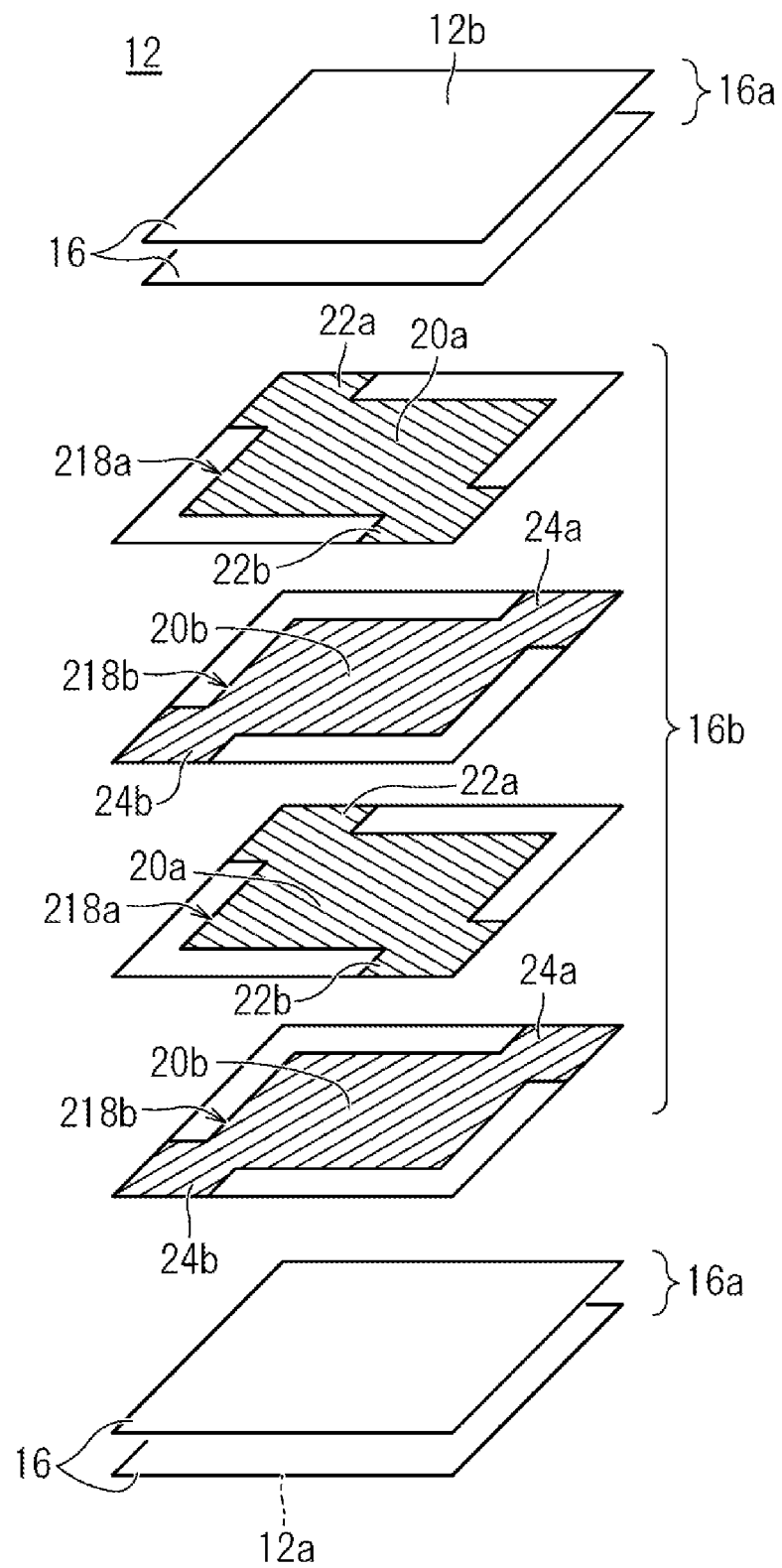
FIG. 27 is an exploded perspective view of a laminate illustrated in FIGS. 23 to 26.

Next, a multilayer ceramic capacitor according to a third preferred embodiment of the present invention will be described. FIG. 23 is an external perspective view illustrating the third preferred embodiment of a multilayer ceramic capacitor according to the present invention. FIG. 24 is a sectional view of the multilayer ceramic capacitor illustrated in FIG. 23, taken along line XXIV-XXIV. FIG. 25 is a sectional view of the multilayer ceramic capacitor illustrated in FIG. 23, taken along line XXV-XXV. FIG. 26 is a sectional view of the multilayer ceramic capacitor illustrated in FIG. 23, taken along line XXVI-XXVI. FIG. 27 is an exploded perspective view of the laminate illustrated in FIGS. 23 to 26. In a multilayer ceramic capacitor 210 illustrated in FIGS. 23 to 27, the same portions as those of the multilayer ceramic capacitor 10 illustrated in FIGS. 1 to 5 are denoted by the same reference numerals, and description thereof is omitted.

The multilayer ceramic capacitor 210 illustrated in FIGS. 23 to 27 is different from the multilayer ceramic capacitor 10 illustrated in FIGS. 1 to 5 in that an internal electrode 218 is extended to not only a first side surface 12c and a second side surface 12d, but also a third side surface 12e and a fourth side surface 12f. In addition, the multilayer ceramic capacitor 210 is different from the multilayer ceramic capacitor 110 illustrated in FIGS. 14 to 18 in the shape of an extended portion of the internal electrode 218, and the shape of external electrodes 214 and 215.

The multilayer ceramic capacitor 210 includes a laminate 12 having a rectangular or substantially rectangular parallelepiped shape, and the external electrodes 214 and 215.

The laminate 12 includes a plurality of dielectric layers 16 and a plurality of internal electrodes 218.

In the multilayer ceramic capacitor 210, the internal electrodes 218 are alternately laminated with the dielectric layer 16 interposed therebetween in the laminate 12, as illustrated in FIGS. 14 and 18.

The laminate 12 includes a plurality of first internal electrodes 218a and a plurality of second internal electrodes 218b as the plurality of internal electrodes 218. The first inner electrode 218a and the second inner electrode 218b are alternately laminated with the dielectric layer 16 interposed therebetween.

The first internal electrode 218a is disposed on a surface of the dielectric layer 16. The first inner electrode 218a includes a first opposed portion 20a, facing the first main surface 12a and the second main surface 12b, and is laminated in a direction connecting the first main surface 12a and the second main surface 12b.

The second internal electrode 218b is disposed on a surface of the dielectric layer 16 different from the dielectric layer 16 on which the first internal electrode 218a is disposed. The second internal electrode 118b includes a second opposed portion 20b facing the first main surface 12a and the second main surface 12b, and is laminated in the direction connecting the first main surface 12a and the second main surface 12b.

In the multilayer ceramic capacitor 210, the internal electrodes 218 may be alternately laminated with the dielectric layer 16 interposed therebetween in the laminate 12, as illustrated in FIGS. 24 to 27.

Figure 28A:
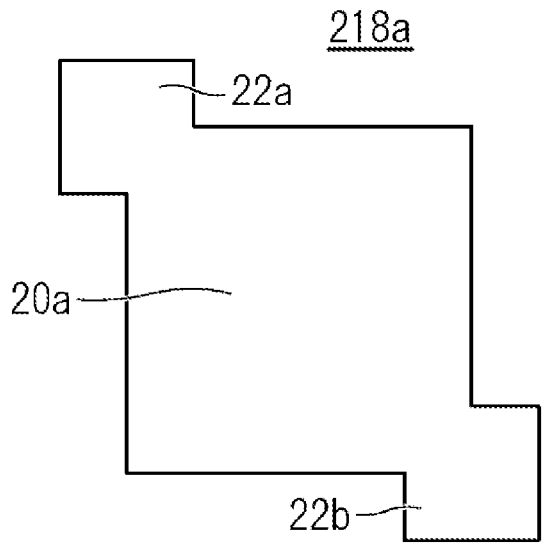
FIG. 28A illustrates a first internal electrode pattern of the multilayer ceramic capacitor illustrated in FIG. 23.
Figure 28B:
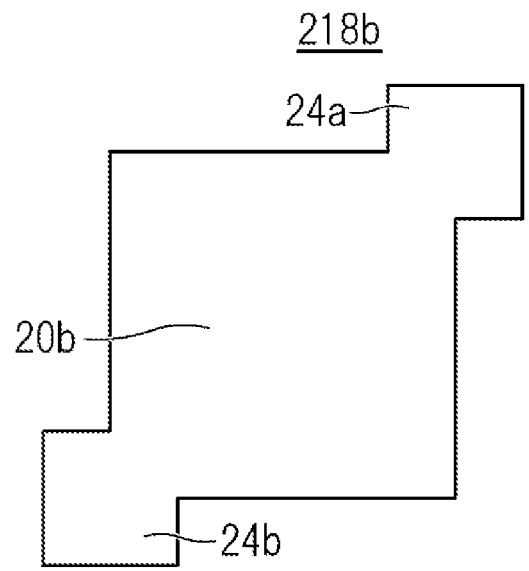
FIG. 28B illustrates a second internal electrode pattern thereof.
Figure 32A:
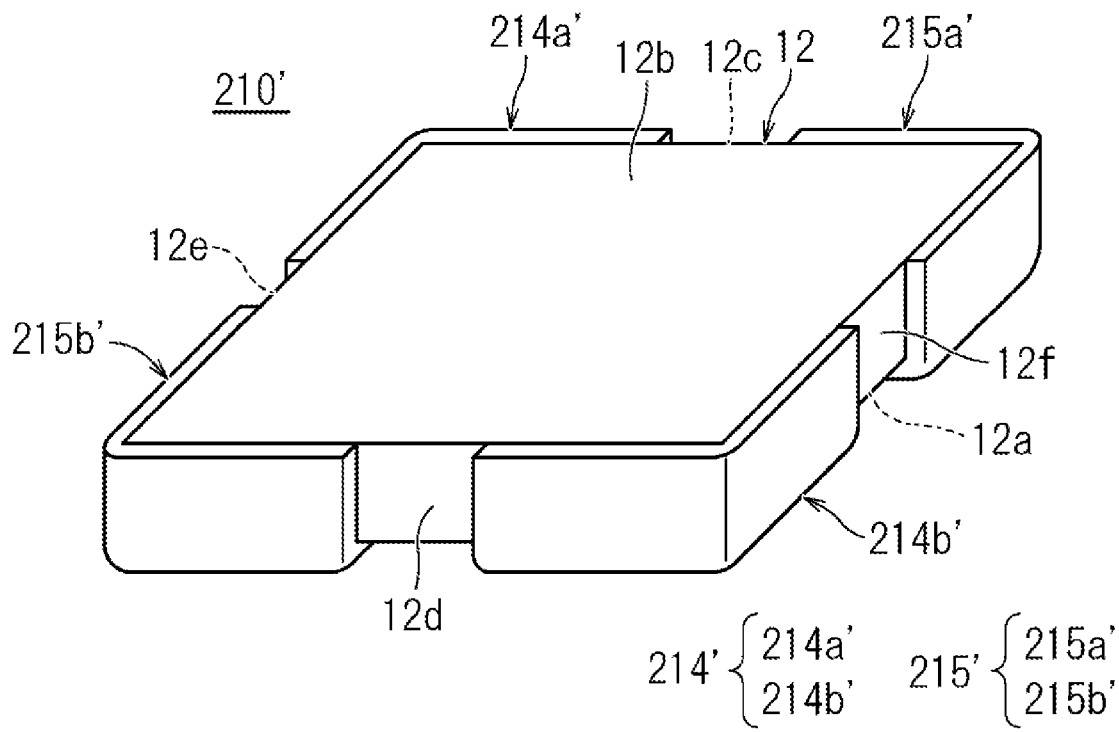
FIG. 32A is an external perspective view illustrating a multilayer ceramic capacitor according to a modification of the third preferred embodiment of the present invention.
Figure 32B:
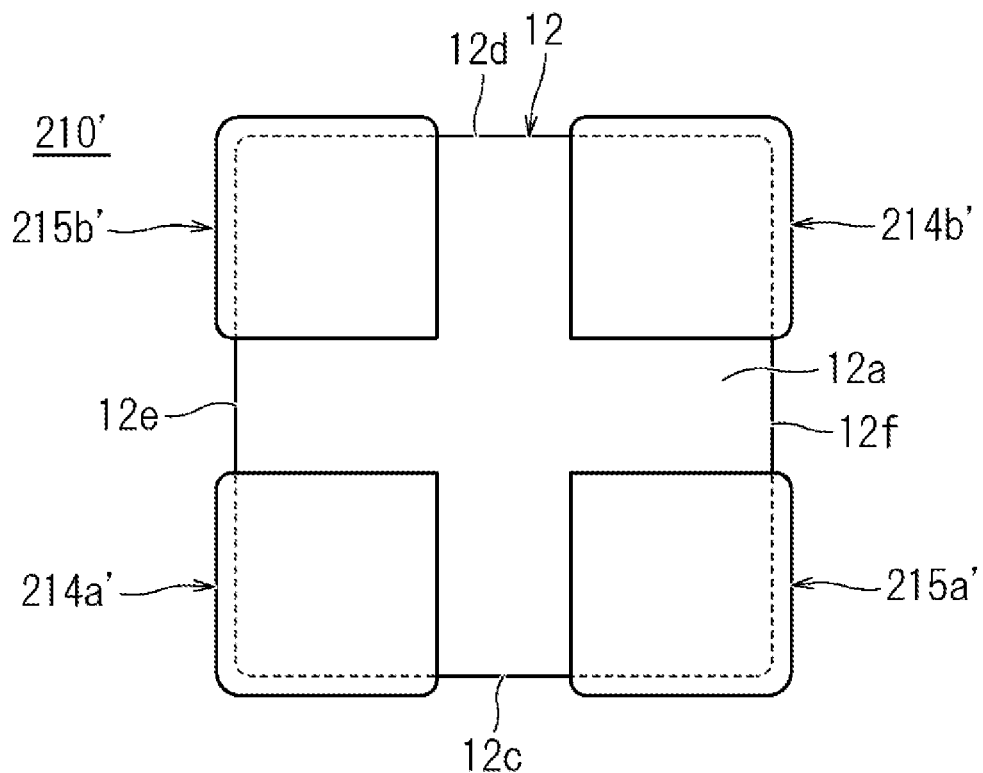
FIG. 32B is a bottom view thereof.

FIG. 27 is an exploded perspective view of the laminate illustrated in FIG. 23. FIG. 28A illustrates a first internal electrode pattern of the multilayer ceramic capacitor illustrated in FIG. 23, and FIG. 28B illustrates a second internal electrode pattern thereof. FIGS. 32A and 32B are external perspective views of a multilayer ceramic capacitor according to another modification of the third preferred embodiment of the present invention.

That is, as illustrated in FIGS. 24 to 27, the first internal electrode 218a extends to the first side surface 12c and the third side surface 12e of the laminate 12 by the first extended portion 22a, and extends to the second side surface 12d and the fourth side surface 12f of the laminate 12 by the second extended portion 22b. The first extended portion 22a may preferably be structured such that the portion extended to the first side surface 12c has a width equal or substantially equal to that of the portion extended to the third side surface 12e. The second extended portion 22b may preferably be structured such that the portion extended to the second side surface 12d has a width equal or substantially equal to that of the portion extended to the fourth side surface 12f.

That is, the first extended portion 22a extends to the third side surface 12e of the laminate 12, and the second extended portion 22b extends to the fourth side surface 12f of the laminate 12.

The second internal electrode 218b extends to the first side surface 12c and the fourth side surface 12f of the laminate 12 by the third extended portion 24a, and extends to the second side surface 12d and the third side surface 12e of the laminate 12 by the fourth extended portion 24b. As in the first internal electrode 218a, the third extended portion 24a may preferably be structured such that the portion extended to the first side surface 12c has a width equal or substantially equal to that of the portion extended to the fourth side surface 12f. The fourth extended portion 24b may preferably be structured such that the portion extended to the second side surface 12d has a width equal or substantially equal to that of the portion extended to the third side surface 12e.

That is, the second extended portion 24a extends to the fourth side surface 12f of the laminate 12, and the fourth extended portion 24b extends to the third side surface 12e of the laminate 12.

The external electrodes 214 and 215 are provided on the laminate 12.

The external electrode 214 includes a first external electrode 214a electrically connected to the first extended portion 22a of the first internal electrode 218a, and a second external electrode 214b electrically connected to the second extended portion 22b thereof.

The first external electrode 214a covers not only the first extended portion 22a on the first side surface 12c and the third side surface 12e, but also a portion of the first main surface 12a and the second main surface 12b. The second external electrode 214b covers not only the second extended portion 22b on the second side surface 12d and the fourth side surface 12f, but also a portion of the first main surface 12a and the second main surface 12b.

The external electrode 215 includes a third external electrode 215a electrically connected to the third extended portion 24a of the second internal electrode 218b, and a fourth external electrode 215b electrically connected to the fourth extended portion 24b thereof.

The third external electrode 215a covers not only the third extended portion 24a on the first side surface 12c and the fourth side surface 12f, but also a portion of the first main surface 12a and the second main surface 12b. The fourth external electrode 215b cover not only the fourth extended portion 24b on the second side surface 12d and the third side surface 12e, but also a portion of the first main surface 12a and the second main surface 12b.

It is preferable that the external electrodes 214 and 215 each include the base electrode layer and the plating layer in order from a laminate 12 side.

The multilayer ceramic capacitor 210 illustrated in FIG. 23 achieves advantageous effects similar to those of the multilayer ceramic capacitor 10 described above.

Next, a multilayer ceramic capacitor according to a modification of the third preferred embodiment of the present invention will be described. FIG. 32A is an external perspective view illustrating a multilayer ceramic capacitor according to a modification of the third preferred embodiment of the present invention, and FIG. 32B is a bottom view thereof. In a multilayer ceramic capacitor 210' illustrated in FIGS. 32A and 32B, the same portions as those of the multilayer ceramic capacitor 10 illustrated in FIGS. 1 to 5, and of the multilayer ceramic capacitor 210 illustrated in FIGS. 23 to 28, are denoted by the same reference numerals, and description thereof is omitted.

The multilayer ceramic capacitor 210' includes a laminate 12 having a rectangular or substantially rectangular parallelepiped shape, and the external electrodes 214' and 215'.

The external electrode 214' includes a first external electrode 214a' electrically connected to the first extended portion 22a of the first internal electrode 218a, and a second external electrode 214b' electrically connected to the second extended portion 22b thereof.

The first external electrode 214a' covers not only the first extended portion 22a on the first side surface 12c and the third side surface 12e, but also a portion of the first main surface 12a. The second external electrode 214b' covers not only the second extended portion 22b on the second side surface 12d and the fourth side surface 12f, but also a portion of the first main surface 12a.

The external electrode 215' includes a third external electrode 215a' electrically connected to the third extended portion 24a of the second internal electrode 218b, and a fourth external electrode 215b' electrically connected to the fourth extended portion 24b thereof.

The third external electrode 215a' covers not only the third extended portion 24a on the first side surface 12c and the fourth side surface 12f, but also a portion of the first main surface 12a. The fourth external electrode 215b' covers not only the fourth extended portion 24b on the second side surface 12d and the third side surface 12e, but also a portion of the first main surface 12a.

It is preferable that the external electrodes 214' and 215' each include the base electrode layer and the plating layer in order from a laminate 12 side.

The multilayer ceramic capacitor 210' illustrated in FIGS. 32A and 32B achieves not only the advantageous effects similar to those of the multilayer ceramic capacitor 10 described above, but also the following advantageous effects.

That is, the external electrodes 214' and 215' are not provided on the surface of the second main surface 12b, so that the thickness of the laminate 12 is able to be increased by the thickness for the external electrodes 214' and 215'. This enables an increase in strength of the multilayer ceramic capacitor 210' and in capacitance per volume thereof. In addition, solder is prevented from spreading over the upper surface (the second main surface 12b) of the multilayer ceramic capacitor 210' by getting wet during mounting. This enables the thickness of the laminate 12 to be further increased.

Next, a non-limiting example of a method for manufacturing the multilayer ceramic capacitors 210 and 210' will be described.

First, a ceramic green sheet and a conductive paste for an internal electrode are prepared. The ceramic green sheet and the conductive paste for an internal electrode each include a binder (e.g., a known organic binder, etc.) and a solvent (e.g., an organic solvent, etc.).

Next, the conductive paste is applied to the ceramic green sheet in a predetermined pattern by gravure printing, for example, to form an internal electrode pattern as illustrated in FIGS. 28A and 28B. Specifically, a conductive paste layer is formed by applying a paste made of a conductive material to the ceramic green sheet by a method, such as a gravure method, for example. The paste made of a conductive material is acquired by adding an organic binder and an organic solvent to metal powder, for example. Then, a ceramic green sheet for an outer layer on which the internal electrode pattern is not printed is also produced.

The ceramic green sheets on which the corresponding internal electrode patterns are formed are used to produce a laminated sheet. That is, the laminated sheet is produced as follows: a ceramic green sheet with no internal electrode pattern is laminated; a ceramic green sheet with an internal electrode pattern corresponding to the first internal electrode 18a as illustrated in FIG. 28A and a ceramic green sheet with an internal electrode pattern corresponding to the second internal electrode 18b as illustrated in FIG. 28B are alternately laminated thereon; and a ceramic green sheet with no internal electrode pattern is further laminated. Subsequently, the laminated sheet is pressure-bonded in the lamination direction x by, for example, an isostatic press or other suitable press to produce a laminated block.

The laminated sheet is further pressed in the lamination direction by, for example, an isostatic press or other suitable press to produce a laminated block.

Subsequently, the laminated block is cut into a predetermined size to produce a laminated chip. At this time, barrel polishing or other suitable polishing may be applied to the laminated chip to round corners and ridgeline portions thereof.

Figure 29:
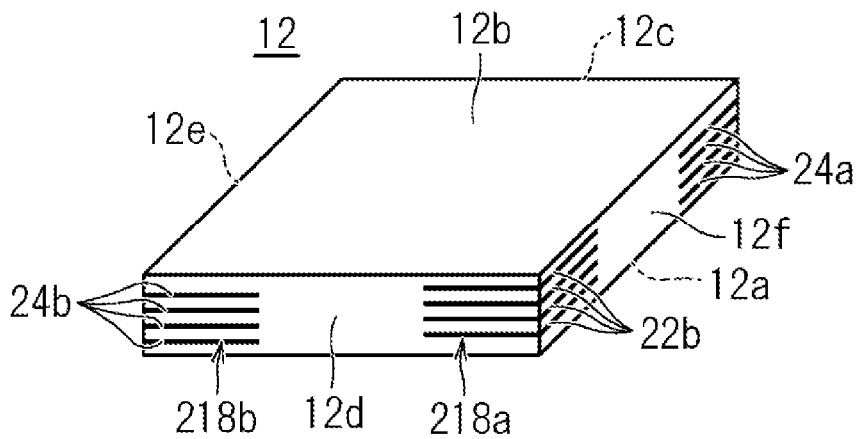
FIG. 29 is an external perspective view of the laminate of the multilayer ceramic capacitor of FIG. 23.
Figure 30:
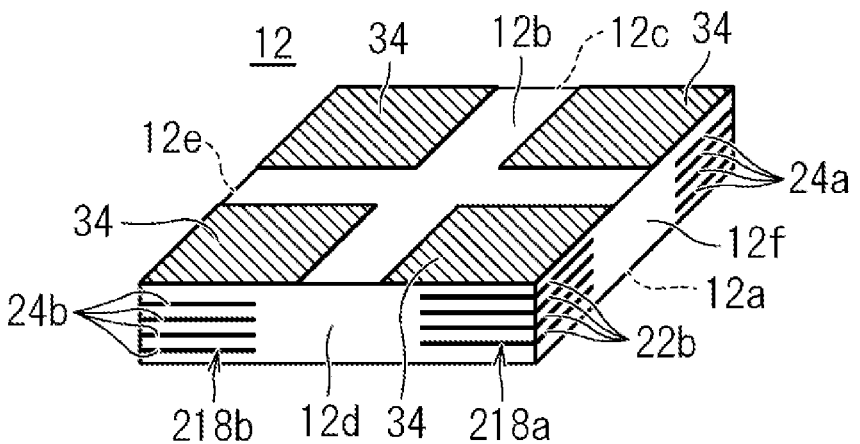
FIG. 30 is an external perspective view in which a base electrode layer for a main surface is provided on the laminate illustrated in FIG. 29.

Next, the laminated chip is fired to produce the laminate 12 as illustrated in FIG. 29. The firing temperature is preferably about 900° C. or higher and about 1300° C. or lower, depending on material of the ceramic and the internal electrode.

At this time, as illustrated in FIG. 29, the first extended portion 22a of the first internal electrode 218a is exposed from the first side surface 12c and the third side surface 12e of the laminate 12, and the third extended portion 24a of the second internal electrode 218b is exposed from the first side surface 12c and the fourth side surface 12f of the laminate 12. In addition, the second extended portion 22b of the first internal electrode 218a is exposed from the second side surface 12d and the fourth side surface 12f of the laminate 12, and the fourth extended portion 24b of the second internal electrode 218b is exposed from the second side surface 12d and the third side surface 12e of the laminate 12.

Subsequently, the external electrodes 214 and 215 are formed on the laminate 12.

That is, the main surface base electrode layer 34, primarily including Ni/Cu alloy, is formed on the first main surface 12a and the second main surface 12b by sputtering, for example, to form the base electrode layer 32 on a side surface to cover the first extended portion 22a of the first internal electrode 218a. In addition, the main surface base electrode layer 34, primarily including Ni/Cu alloy, is formed on the first main surface 12a and the second main surface 12b by sputtering, for example, to form the base electrode layer 32 on a side surface to cover the third extended portion 24a of the second internal electrode 218b. At this time, the main surface base electrode layer does not substantially wrap around the side surface.

Similarly, the main surface base electrode layer 34, primarily including Ni/Cu alloy, is formed on the first main surface 12a and the second main surface 12b by sputtering, for example, to form the base electrode layer 32 on a side surface to cover the second extended portion 22b of the first internal electrode 218a. In addition, the main surface base electrode layer 34, primarily including Ni/Cu alloy, is formed on the first main surface 12a and the second main surface 12b by sputtering, for example, to form the base electrode layer 32 on a side surface to cover the fourth extended portion 24b of the second internal electrode 218b. At this time, the main surface base electrode layer does not substantially wrap around the side surface.

Figure 31:
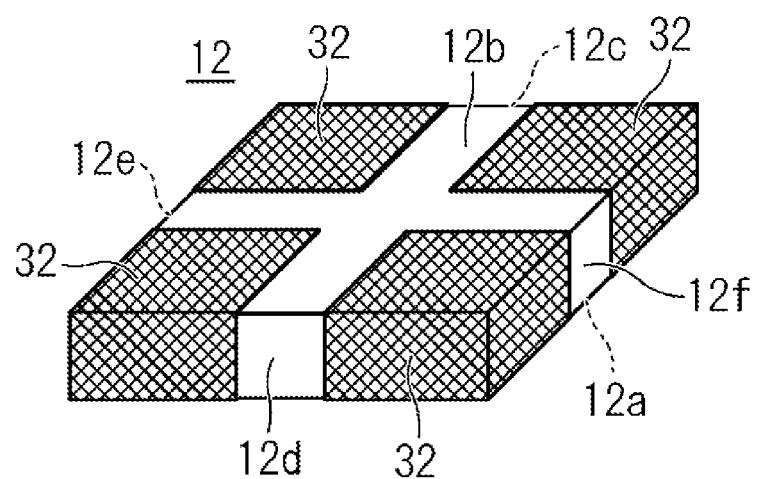
FIG. 31 is an external perspective view in which a base electrode layer for a side surface is provided on the laminate having the base electrode layer for a main surface illustrated in FIG. 30.

Subsequently, as illustrated in FIG. 31, the base side surface electrode layer 32 is formed continuously on not only a portion of the first side surface 12c and the third side surface 12e, but also a portion of the first main surface 12a and the second main surface 12b, as a plating electrode by Cu plating or other suitable plating so as to cover not only the first extended portion 22a of the first internal electrode 218a, exposed from the first side surface 12c and the third side surface 12e of the laminate 12, but also the base electrode 34 on a main surface. Accordingly, the base electrode layer 28 of the first external electrode 214a is formed. In addition, the side surface base electrode layer 32 is formed continuously on not only a portion of the first side surface 12c and the fourth side surface 12f, but also a portion of the first main surface 12a and the second main surface 12b, as a plating electrode by Cu plating or other plating so as to cover the third extended portion 24a of the second internal electrode 218b, exposed from the first side surface 12c and the fourth side surface 12f of the laminate 12. Accordingly, the base electrode layer 28 of the third external electrode 215a is formed.

Similarly, the side surface base electrode layer 32 is formed continuously on not only a portion of the second side surface 12d and the fourth side surface 12f, but also a portion of the first main surface 12a and the second main surface 12b, as a plating electrode by Cu plating or other suitable plating so as to cover the second extended portion 22b of the first internal electrode 218a, exposed from the second side surface 12d and the fourth side surface 12f of the laminate 12. Accordingly, the base electrode layer 28 of the second external electrode 214b is formed. In addition, the side surface base electrode layer 32 is formed continuously on not only a portion of the second side surface 12d and the third side surface 12e, but also a portion of the first main surface 12a and the second main surface 12b, as a plating electrode by Cu plating or other suitable plating so as to cover the fourth extended portion 24b of the second internal electrode 218b, exposed from the second side surface 12d and the third side surface 12e of the laminate 12. Accordingly, the base electrode layer 28 of the fourth external electrode 215b is formed.

When the external electrodes 214' and 215' are each formed so as not to be disposed on the second main surface 12b as in the multilayer ceramic capacitor 210', the main surface base electrode layer 34 is not formed on the second main surface 12b.

Then, the plating layer 30 is formed so as to cover the base electrode layer 32 on each side surface.

At this time, preferably, a Cu plating layer is formed on the plating layer 30, a Ni plating layer is formed on a surface of the Cu plating layer, and a Sn plating layer is formed on a surface of the Ni plating layer, for example. A step of forming each plating may be performed multiple times.

As described above, the multilayer ceramic capacitors 210 and 210', as illustrated in FIG. 23, are manufactured.

Advantageous effects of the multilayer ceramic capacitor acquired as described above will be apparent from the following experimental examples.

Hereinafter, examples of experiments conducted by the inventors of preferred embodiments of the present invention to determine the advantageous effects of preferred embodiments of the present invention will be described.

Experimental Example 1

In Experimental Example 1, a test for checking deflective strength was performed.

According to the non-limiting example of a method for manufacturing a multilayer ceramic capacitor, described in the first preferred embodiment, samples of multilayer ceramic capacitors of Examples 1 to 13 having specifications described below were produced as examples.

Multilayer ceramic capacitors in respective examples had common specifications as follows:

The dielectric layer is made of material including a main component of barium titanate and an accessory component of Mg, V, Dy, and Si;

The internal electrode is made of Ni;

The external electrode are formed on each main surface;

The external electrode had a thickness of about 11.5 µm in a lamination direction x (an average value of thicknesses of a multilayer ceramic capacitor in a central portion of an external electrode forming region as viewed from the lamination direction of the multilayer ceramic capacitor); and The external electrode is formed by sputtering on each main surface having a square or substantially square shape with sides each having a length equal or substantially equal to that of an external electrode disposed on a first side surface or a second side surface in the width direction z.

The multilayer ceramic capacitor of each example had specifications as follows.

The multilayer ceramic capacitor of each of Examples 1 to 5 had a square or substantially square shape when viewed from the lamination direction x, and had a dimension L in the longitudinal direction y of the multilayer ceramic capacitor and a dimension W thereof in the width direction z, being varied. Other common specifications were as follows:

The external electrode had a length of about 0.225 mm in the width direction z at a center or approximate center of a surface WT (a first side surface or a second side surface) in the lamination direction x;

The external electrode had a length of about 0.050 mm in the lengthwise direction y at a center or approximate center of a surface LT (a third side surface or a fourth side surface) in the lamination direction x;

The dielectric layer had an average thickness of about 0.8 µm;

The internal electrode had an average thickness of about 0.5 µm;

The laminate had a dimension t of about 67 µm in the lamination direction x;

The outer layer had a thickness of about 13 µm;

The effective layer had a thickness t' of about 41 µm; and

The ratio t'/t was about 0.61.

Example 1

The multilayer ceramic capacitor had the following size (design value): L×W×T=about 550 µm×about 550 µm×about 90 µm; and The ratio W/L was about 1.00.

Example 2

The multilayer ceramic capacitor had the following size (design value): L×W×T=about 600 µm×about 600 µm×about 90 µm; and The ratio W/L was about 1.00.

Example 3

The multilayer ceramic capacitor had the following size (design value): L×W×T=about 650 µm×about 650 µm×about 90 µm; and The ratio W/L was about 1.00.

Example 4

The multilayer ceramic capacitor had the following size (design value): L×W×T=about 700 µm×about 700 µm×about 90 µm; and The ratio W/L was about 1.00.

Example 5

The multilayer ceramic capacitor had the following size (design value): L×W×T=about 750 µm×about 750 µm×about 90 µm; and The ratio W/L was about 1.00.

The multilayer ceramic capacitor of each of Examples 6 to 9 had a rectangular or substantially rectangular shape when viewed from the lamination direction x, and had a dimension L in the longitudinal direction y of the multilayer ceramic capacitor and a dimension W in the width direction z thereof, being varied. Other specifications were as follows:

The external electrode had a length of about 0.225 mm in the width direction z at a center or approximate center of a surface WT (a first side surface or a second side surface) in the lamination direction x;

The external electrode had a length of about 0.050 mm in the lengthwise direction y at a center or approximate center of a surface LT (a third side surface or a fourth side surface) in the lamination direction x;

The dielectric layer had an average thickness of about 0.8 µm;

The internal electrode had an average thickness of about 0.5 µm;

The laminate had a dimension t of about 67 µm in the lamination direction x;

The outer layer had a thickness of about 13 µm;

The effective layer had a thickness t' of about 41 µm; and

The ratio t'/t was about 0.61.

Example 6

The multilayer ceramic capacitor had the following size (design value): L×W×T=about 630 µm×about 570 µm×about 90 µm; and The ratio W/L was about 0.90.

Example 7

The multilayer ceramic capacitor had the following size (design value): L×W×T=about 650 µm×about 550 µm×about 90 µm; and The ratio W/L was about 0.85.

Example 8

The multilayer ceramic capacitor had the following size (design value): L×W×T=about 700 µm×about 600 µm×about 90 µm; and The ratio W/L was about 0.86.

Example 9

The multilayer ceramic capacitor had the following size (design value): L×W×T=about 750 µm×about 650 µm×about 90 µm; and The ratio W/L was about 0.87.

The multilayer ceramic capacitors of Examples 10 and 11 were obtained by changing the thickness of the outer layer. Other common specifications were as follows:

The multilayer ceramic capacitor had the following size (design value): L×W×T=about 600 µm×about 600 µm×about 90 µm;

The ratio W/L was about 1.00;

The external electrode had a length of about 0.225 mm in the width direction z at a center or approximate center of a surface WT (a first side surface or a second side surface) in the lamination direction x;

The external electrode had a length of about 0.050 mm in the lengthwise direction y at a center or approximate center of a surface LT (a third side surface or a fourth side surface) in the lamination direction x;

The dielectric layer had an average thickness of about 0.8 µm;

The internal electrode had an average thickness of about 0.5 µm;

The laminate had a dimension t of about 67 µm in the lamination direction x.

Example 10

The outer layer had a thickness of about 15 µm;

The effective layer had a thickness t' of about 37 µm; and

The ratio t'/t was about 0.55.

Example 11

The outer layer had a thickness of about 5 µm;

The effective layer had a thickness t' of about 57 µm; and

The ratio t'/t was about 0.85;

The multilayer ceramic capacitors of Examples 12 and 13 were different in a dimension T in the lamination direction x from Examples 1 to 11, and were obtained by changing thicknesses of the outer layer and the effective layer. Other common specifications were as follows:

The multilayer ceramic capacitor had the following size (design value): L×W×T=about 600 µm×about 600 µm×about 70 µm;

The ratio W/L was about 1.00;

The external electrode had a length of about 0.225 mm in the width direction z at a center or approximate center of a surface WT (a first side surface or a second side surface) in the lamination direction x;

The external electrode had a length of about 0.050 mm in the lengthwise direction y at a center or approximate center of a surface LT (a third side surface or a fourth side surface) in the lamination direction x;

The dielectric layer had an average thickness of about 0.8 µm;

The internal electrode had an average thickness of about 0.5 µm;

The laminate had a dimension t of about 47 µm in the lamination direction x.

Example 12

The outer layer had a thickness of about 8 µm;

The effective layer had a thickness t' of about 31 µm; and

The ratio t'/t was about 0.66.

Example 13

The outer layer had a thickness of about 5 µm;

The effective layer had a thickness t' of about 37 µm; and

The ratio t'/t was 0.79.

As comparative examples, samples of multilayer ceramic capacitors of Comparative Examples 1 to 6 having the specifications described below were produced.

The multilayer ceramic capacitor in each of Comparative Examples 1 and 2 is a two-terminal multilayer ceramic capacitor 1 as illustrated in FIG. 24, and includes a laminate 2 having a rectangular or substantially rectangular parallelepiped shape, provided at both ends with respective external electrodes 3 and 3. The external electrodes 3 and 3 of the multilayer ceramic capacitor 1 of each of Comparative Examples 1 and 2 were formed by dipping. The material of the dielectric, the material of the internal electrode, and other materials are the same or substantially the same as those in the examples.

The multilayer ceramic capacitors of Comparative Examples 3 and 4 were produced according to the non-limiting example of a method for manufacturing a multilayer ceramic capacitor, described in the first preferred embodiment.

The multilayer ceramic capacitor of each comparative example had the following specifications.

Comparative Example 1

The multilayer ceramic capacitor had the following size (design value): L×W×T=about 630 μm×about 270 μm×about 90 μm;
The ratio W/L was about 0.43;
The external electrode had a length of about 0.27 mm in the width direction z at a center or approximate center of a surface WT (a first side surface or a second side surface) in the lamination direction x;
The external electrode had a length of about 0.050 mm in the lengthwise direction y at a center or approximate of a surface LT (a third side surface or a fourth side surface) in the lamination direction x;
The dielectric layer had an average thickness of about 0.8 μm;
The internal electrode had an average thickness of about 0.5 μm;
The laminate had a dimension t of about 67 μm in the lamination direction x;
The outer layer had a thickness of 13 μm;
The effective layer had a thickness t' of about 41 μm; and
The ratio t'/t was about 0.61.

Comparative Example 2

The multilayer ceramic capacitor had the following size (design value): L×W×T=about 1050 μm×about 450 μm×about 90 μm;
The ratio W/L was about 0.43;
The external electrode had a length of about 0.45 mm in the width direction z at a center or approximate center of a surface WT (a first side surface or a second side surface) in the lamination direction x;
The external electrode had a length of about 0.050 mm in the lengthwise direction y at a center or approximate of a surface LT (a third side surface or a fourth side surface) in the lamination direction x;
The dielectric layer had an average thickness of about 1.1 μm;
The internal electrode had an average thickness of about 0.6 μm;
The laminate had a dimension t of about 67 μm in the lamination direction x;
The outer layer had a thickness of about 13 μm;
The effective layer had a thickness t' of about 41 μm; and
The ratio t'/t was about 0.61.

Comparative Example 3

The multilayer ceramic capacitor had the following size (design value): L×W×T=about 750 μm×about 550 μm×about 90 μm;
The ratio W/L was about 0.73;
The external electrode had a length of about 0.225 mm in the width direction z at a center or approximate center of a surface WT (a first side surface or a second side surface) in the lamination direction x;
The external electrode had a length of about 0.050 mm in the lengthwise direction y at a center or approximate center of a surface LT (a third side surface or a fourth side surface) in the lamination direction x;
The dielectric layer had an average thickness of about 0.8 μm;
The internal electrode had an average thickness of about 0.5 μm;
The laminate had a dimension t of about 67 μm in the lamination direction x;
The outer layer had a thickness of about 13 μm;
The effective layer had a thickness t' of about 41 μm; and
The ratio t'/t was about 0.61.

Comparative Example 4

The multilayer ceramic capacitor had the following size (design value): L×W×T=about 800 μm×about 600 μm×about 90 μm;
The ratio W/L was about 0.75;
The external electrode had a length of about 0.225 mm in the width direction z at a center or approximate of a surface WT (a first side surface or a second side surface) in the lamination direction x;
The external electrode had a length of about 0.050 mm in the lengthwise direction y at a center or approximate center of a surface LT (a third side surface or a fourth side surface) in the lamination direction x;
The dielectric layer had an average thickness of 0.8 μm;
The internal electrode had an average thickness of about 0.5 μm;
The laminate had a dimension t of about 67 μm in the lamination direction x;
The outer layer had a thickness of about 13 μm;
The effective layer had a thickness t' of about 41 μm; and
The ratio t'/t was 0.61.

Comparative Example 5

The multilayer ceramic capacitor had the following size (design value): L×W×T=about 600 μm×about 600 μm×about 90 μm;
The ratio W/L was about 1.00;
The external electrode had a length of about 0.225 mm in the width direction z at a center or approximate center of a surface WT (a first side surface or a second side surface) in the lamination direction x;
The external electrode had a length of about 0.050 mm in the lengthwise direction y at a center or approximate center of a surface LT (a third side surface or a fourth side surface) in the lamination direction x;
The dielectric layer had an average thickness of about 0.8 μm;

The internal electrode had an average thickness of about 0.5 μm;

The laminate had a dimension t of about 67 μm in the lamination direction x;

The outer layer had a thickness of about 18 μm;

The effective layer had a thickness t' of about 31 μm; and

The ratio t'/t was about 0.46.

Comparative Example 6

The multilayer ceramic capacitor had the following size (design value): L×W×T=about 600 μm×about 600 μm×about 70 μm:

The ratio W/L was about 1.00;

The external electrode had a length of about 0.225 mm in the width direction z at a center or approximate center of a surface WT (a first side surface or a second side surface) in the lamination direction x;

The external electrode had a length of about 0.050 mm in the lengthwise direction y at a center or approximate center of a surface LT (a third side surface or a fourth side surface) in the lamination direction x;

The dielectric layer had an average thickness of about 0.8 μm;

The internal electrode had an average thickness of about 0.5 μm;

The laminate had a dimension t of about 47 μm in the lamination direction x.

The outer layer had a thickness of about 13 μm;

The effective layer had a thickness t' of about 21 μm; and

The ratio t'/t was about 0.45.

Figure 33:
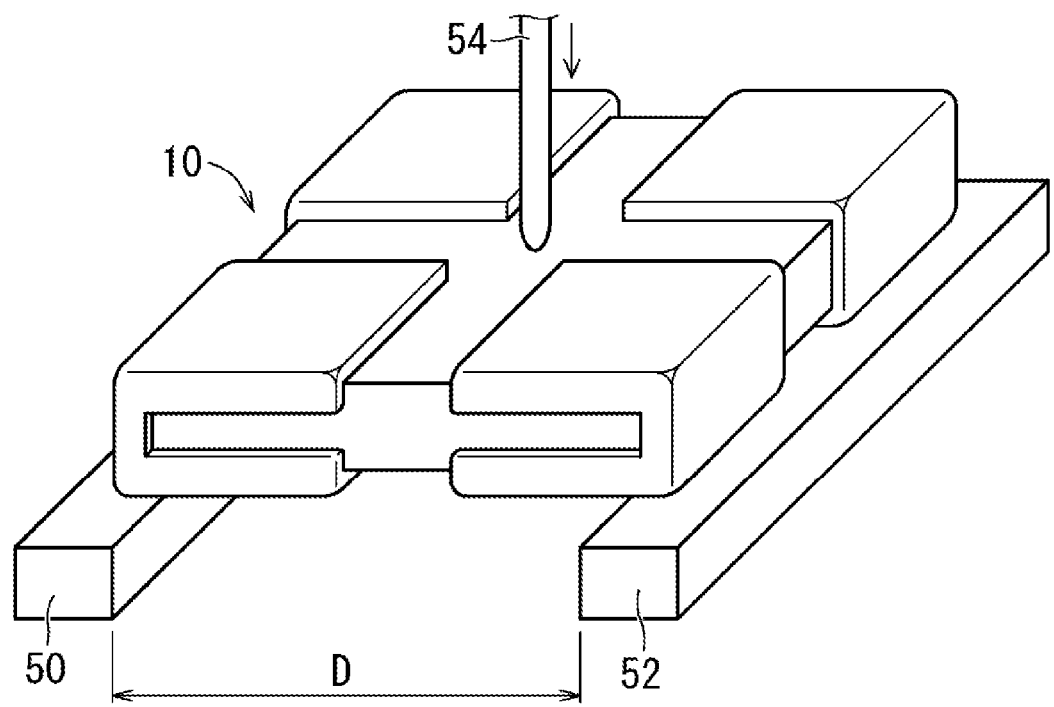
FIG. 33 is a schematic external perspective view for illustrating a test state of a deflective strength test.
Figure 34:
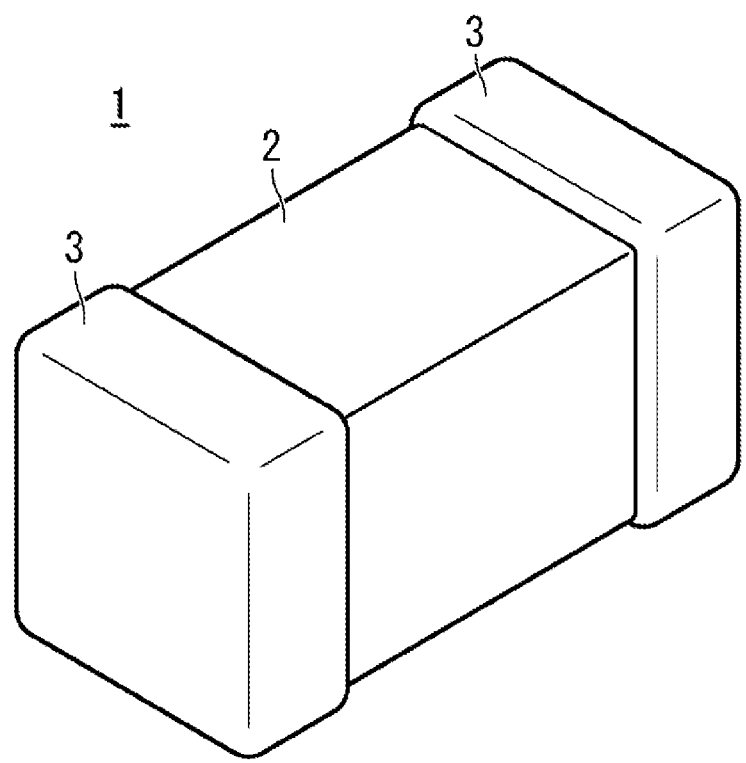
FIG. 34 is an external perspective view of a multilayer ceramic capacitor of Comparative Example 1 and Comparative Example 2.

As illustrated in FIG. 33, the distance D between the chip holding bases 50 and 52 was set to about 400 μm (about 700 μm for only Comparative Example 2), and the center of the main surface of the multilayer ceramic capacitor of the sample was pushed with a push rod 54 having a diameter of about 50 μm. The pushing force was gradually increased until reaching about 1 N.

Defects of the internal structure were checked by grinding the LT surface to a center or approximate center of the width direction z to check whether there is a crack. A product with a crack was defined as an NG product, and the number of NG products was checked. The number of evaluations for each example and each comparative example was 25.

The results of checking the number of cracks for each of the examples and the comparative examples described above, are shown in Tables 1 to 3.

TABLE 1

|  |  | Example 1 | Example 2 | Example 3 | Example 4 | Example 5 |
|---|---|---|---|---|---|---|
| Dimension L | (μm) | 550 | 600 | 650 | 700 | 750 |
| Dimension W | (μm) | 550 | 600 | 650 | 700 | 750 |
| Dimension T | (μm) | 90 | 90 | 90 | 90 | 90 |
| Ratio: W/L |  | 1.00 | 1.00 | 1.00 | 1.00 | 1.00 |
| Length of external electrode in width direction at position of ½ of surface WT in lamination direction | (mm) | 0.225 | 0.225 | 0.225 | 0.225 | 0.225 |
| Length of external electrode in lengthwise direction at position of ½ of surface LT in lamination direction | (mm) | 0.050 | 0.050 | 0.050 | 0.050 | 0.050 |
| Dielectric layer average thickness | (μm) | 0.8 | 0.8 | 0.8 | 0.8 | 0.8 |
| Internal electrode average thickness | (μm) | 0.5 | 0.5 | 0.5 | 0.5 | 0.5 |
| Laminate dimension T: t | (μm) | 67 | 67 | 67 | 67 | 67 |
| Outer layer thickness (One side) | (μm) | 13 | 13 | 13 | 13 | 13 |
| Effective layer thickness: t' | (μm) | 41 | 41 | 41 | 41 | 41 |
| Ratio: t'/t |  | 0.61 | 0.61 | 0.61 | 0.61 | 0.61 |
| The number of internal structural defects in deflective strength test | (piece) | 0/25 | 0/25 | 0/25 | 0/25 | 0/25 |

TABLE 2

|  |  | Example 6 | Example 7 | Example 8 | Example 9 | Example 10 | Example 11 | Example 12 | Example 13 |
|---|---|---|---|---|---|---|---|---|---|
| Dimension L | (μm) | 630 | 650 | 700 | 750 | 600 | 600 | 600 | 600 |
| Dimension W | (μm) | 570 | 550 | 600 | 650 | 600 | 600 | 600 | 600 |
| Dimension T | (μm) | 90 | 90 | 90 | 90 | 90 | 90 | 70 | 70 |
| Ratio: W/L |  | 0.90 | 0.85 | 0.86 | 0.87 | 1.00 | 1.00 | 1.00 | 1.00 |
| Length of external electrode in width direction at position of ½ of surface WT in lamination direction | (mm) | 0.225 | 0.225 | 0.225 | 0.225 | 0.225 | 0.225 | 0.225 | 0.225 |
| Length of external electrode in lengthwise direction at position of ½ of surface LT in lamination direction | (mm) | 0.050 | 0.050 | 0.050 | 0.050 | 0.050 | 0.050 | 0.050 | 0.050 |
| Dielectric layer average thickness | (μm) | 0.8 | 0.8 | 0.8 | 0.8 | 0.8 | 0.8 | 0.8 | 0.8 |
| Internal electrode average thickness | (μm) | 0.5 | 0.5 | 0.5 | 0.5 | 0.5 | 0.5 | 0.5 | 0.5 |
| Laminate dimension T: t | (μm) | 67 | 67 | 67 | 67 | 67 | 67 | 47 | 47 |
| Outer layer thickness (One side) | (μm) | 13 | 13 | 13 | 13 | 15 | 5 | 8 | 5 |
| Effective layer thickness: t' | (μm) | 41 | 41 | 41 | 41 | 37 | 57 | 31 | 37 |
| Ratio: t'/t |  | 0.61 | 0.61 | 0.61 | 0.61 | 0.55 | 0.85 | 0.66 | 0.79 |
| The number of internal structural defects in deflective strength test | (piece) | 0/25 | 0/25 | 0/25 | 0/25 | 0/25 | 0/25 | 0/25 | 0/25 |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
| Dimension L | (μm) | 630 | 1050 | 750 | 800 | 600 | 600 |
| Dimension W | (μm) | 270 | 450 | 550 | 600 | 600 | 600 |
| Dimension T | (μm) | 90 | 90 | 90 | 90 | 90 | 70 |
| Ratio: W/L |  | 0.43 | 0.43 | 0.73 | 0.75 | 1.00 | 1.00 |
| Length of external electrode in width direction at position of ½ of surface WT in lamination direction | (mm) | 0.270 | 0.450 | 0.225 | 0.225 | 0.225 | 0.225 |
| Length of external electrode in lengthwise direction at position of ½ of surface LT in lamination direction | (mm) | 0.050 | 0.050 | 0.050 | 0.050 | 0.050 | 0.050 |
| Dielectric layer average thickness | (μm) | 0.8 | 1.1 | 0.8 | 0.8 | 0.8 | 0.8 |
| Internal electrode average thickness | (μm) | 0.5 | 0.6 | 0.5 | 0.5 | 0.5 | 0.5 |
| Laminate dimension T: t | (μm) | 67 | 67 | 67 | 67 | 67 | 47 |
| Outer layer thickness (One side) | (μm) | 13 | 13 | 13 | 13 | 18 | 13 |
| Effective layer thickness: t' | (μm) | 41 | 41 | 41 | 41 | 31 | 21 |
| Ratio: t'/t |  | 0.61 | 0.61 | 0.61 | 0.61 | 0.46 | 0.45 |
| The number of internal structural defects in deflective strength test | (piece) | 2/25 | 4/25 | 4/25 | 2/25 | 2/25 | 2/25 |

Table 1 shows that when the multilayer ceramic capacitor of each of Examples 1 to 5 viewed from the lamination direction x had a square or substantially square shape, and had a dimension L of the multilayer ceramic capacitor in the longitudinal direction y and a dimension W thereof in the width direction z, being varied, W/L was about 1.00, the dimension L was about 750 μm or less, the dimension T was 90 μm, and t'/t was about 0.61. As a result of the deflective strength test, no internal structural defect was found in any one of Examples 1 to 5.

Table 2 shows that when the multilayer ceramic capacitor of each of Examples 6 to 9 viewed from the lamination direction x had a rectangular or substantially rectangular shape, and had a dimension L of the multilayer ceramic capacitor in the longitudinal direction y and a dimension W thereof in the width direction z, being varied, W/L was about 0.85 or more and 1 or less, the dimension L was about 750 μm or less, the dimension T was about 90 μm, and t'/t was about 0.61. As a result of the deflective strength test, no internal structural defect was found in any one of Examples 6 to 9.

In addition, Table 2 shows that when the multilayer ceramic capacitor of each of Examples 10 and 11 was varied in thickness of the outer layer, W/L was about 1.00, the dimension L was about 750 μm or less, the dimension T was about 70 μm, and t'/t was about 0.55 or more. As a result of the deflective strength test, no internal structural defect was found in either one of Examples 10 and 11.

Further, Table 2 shows that when the multilayer ceramic capacitor of each of Examples 12 and 13 had a dimension T varied from the dimension T in each of Examples 1 to 11 by varying the outer layer and the effective layer in thickness, W/L was about 1.00, the dimension L was about 750 μm or less, the dimension T was about 70 μm, and t'/t was about 0.55 or more. As a result of the deflective strength test, no internal structural defect was found in either one of Examples 12 and 13.

Table 3 shows that Comparative Example 1 had a W/L of about 0.43 outside of a range of about 0.85 or more and about 1 or less, and thus, two NG products were found as a result of the deflective strength test, and that Comparative Example 2 also had a W/L of about 0.43 outside of a range of about 0.85 or more and about 1 or less, and thus, four NG products were found as a result of the deflective strength test.

In addition, Table 3 shows that Comparative Example 3 had a W/L of about 0.73 outside of a range of about 0.85 or more and about 1 or less, and thus, four NG products were found as a result of the deflective strength test, and that Comparative Example 4 also had a W/L of about 0.75 outside of a range of about 0.85 or more and about 1 or less, and a dimension L of about 800 μm different from about 750 μm, and thus, two NG products were found as a result of the deflective strength test.

Further, Table 3 shows that Comparative Example 5 had a t'/t of about 0.46 outside of a range of about 0.55 or more, and thus, two NG products were found as a result of the deflective strength test, and that Comparative Example 6 had a t'/t of about 0.45 outside of a range of about 0.55 or more, and thus, two NG products were found as a result of the deflective strength test.

From the above results, by comparing the dimension L in the longitudinal direction y of the multilayer ceramic capacitor and the dimension W in the width direction z thereof, it was discovered that when the following relationships were satisfied: about 0.85≤W/L≤about 1, and L≤about 750, the multilayer ceramic capacitor laminate had a dimension T in the direction x, satisfying the following relationship: about 70 μm≤T≤about 110 μm, and a dimension t in the lamination direction x of the laminate and a dimension t' in the lamination direction x of the effective layer had a ratio satisfying the following relationship: t'/t≥about 0.55, the deflective strength was increased. That is, as the shape of the multilayer ceramic capacitor, viewed from the lamination direction x, approaches a square or substantially square shape, the deflective strength is increased. As a ratio t'/t increases, that is, the amount of metal increases due to the internal electrode, the deflective strength is increased.

Experimental Example 2

In Experimental Example 2, evaluation of whether there is a short circuit between external electrodes due to migration and evaluation of fixation strength at the time of mounting were performed.

According to the non-limiting example of a method for manufacturing a multilayer ceramic capacitor, described in the first preferred embodiment described above, samples of multilayer ceramic capacitors of Examples 2, and 14 to 19, having specifications described below were produced as examples. In each of Examples 16 to 18, an external electrode was also formed on a third side surface a fourth side surface by roller copying.

In Examples 14 to 19, the external electrodes were varied in overall circumferential length E. Other common specifications were as follows:

The multilayer ceramic capacitor had the following size (design value): L×W×T=about 0.60 mm×about 0.60 mm×about 0.09 mm;

The outer peripheral length B was about 2.4 mm;

The dielectric layer had an average thickness of about 0.8 µm;

The internal electrode had an average thickness of about 0.5 µm;

Example 14

The external electrode had a length of about 0.1 mm in the width direction z at a center or approximate center of a surface WT (a first side surface or a second side surface) in the lamination direction x;

The external electrode had a length of about 0.050 mm in the lengthwise direction y at a center or approximate center of a surface LT (a third side surface or a fourth side surface) in the lamination direction x;

The entire circumferential length E of the external electrode was about 0.6 mm;

The distance G between the external electrodes formed on the main surface was about 0.4 mm; and The ratio E/B was about 0.25.

Example 15

The external electrode had a length of about 0.15 mm in the width direction z at a center or approximate center of a surface WT (a first side surface or a second side surface) in the lamination direction x;

The external electrode had a length of about 0.050 mm in the lengthwise direction y at a center or approximate center of a surface LT (a third side surface or a fourth side surface) in the lamination direction x;

The overall circumferential length E of the external electrode was about 0.8 mm;

The distance G between the external electrodes formed on the main surface was about 0.3 mm; and The ratio E/B was about 0.33.

Example 2

The external electrode had a length of about 0.225 mm in the width direction z at a center or approximate center of a surface WT (a first side surface or a second side surface) in the lamination direction x;

The external electrode had a length of about 0.050 mm in the lengthwise direction y at a center or approximate center of a surface LT (a third side surface or a fourth side surface) in the lamination direction x;

The entire circumferential length E of the external electrode was about 1.1 mm;

The distance G between the external electrodes formed on the main surface was about 0.15 mm; and The ratio E/B was about 0.46.

Example 16

The external electrode had a length of about 0.15 mm in the width direction z at a center or approximate center of a surface WT (a first side surface or a second side surface) in the lamination direction x;

The external electrode had a length of about 0.15 mm in the lengthwise direction y at a center or approximate of a surface LT (a third side surface or a fourth side surface) in the lamination direction x;

The overall circumferential length E of the external electrode was about 1.2 mm;

The distance G between the external electrodes formed on the main surface was about 0.3 mm; and The ratio E/B was 0.50.

Example 17

The external electrode had a length of about 0.25 mm in the width direction z at a center or approximate center of a surface WT (a first side surface or a second side surface) in the lamination direction x;

The external electrode had a length of about 0.25 mm in the lengthwise direction y at a center or approximate of a surface LT (a third side surface or a fourth side surface) in the lamination direction x;

The entire circumferential length E of the external electrode was about 2.0 mm;

The distance G between the external electrodes formed on the main surface was about 0.1 mm; and The ratio E/B was about 0.83.

Example 18

The external electrode had a length of about 0.26 mm in the width direction z at a center or approximate center of a surface WT (a first side surface or a second side surface) in the lamination direction x;

The external electrode had a length of about 0.26 mm in the lengthwise direction y at a center or approximate center of a surface LT (a third side surface or a fourth side surface) in the lamination direction x;

The entire circumferential length E of the external electrode was about 2.08 mm;

The distance G between the external electrodes formed on the main surface was about 0.08 mm; and The ratio E/B was about 0.87.

Example 19

The external electrode had a length of about 0.26 mm in the width direction z at a center or approximate center of a surface WT (a first side surface or a second side surface) in the lamination direction x;

The external electrode had a length of about 0.050 mm in the lengthwise direction y at a center or approximate center of a surface LT (a third side surface or a fourth side surface) in the lamination direction x;

The entire circumferential length E of the external electrode was about 1.24 mm;

The distance G between the external electrodes formed on the main surface was about 0.08 mm; and The ratio E/B was 0.52.

Each sample was solder mounted on a substrate, and maintained at about 3.2 V or less for about 72 hours at a temperature of about 125° C. and a humidity of about 95%, and then it was evaluated whether there was a short circuit between external electrodes due to migration. The number of evaluations for each example was 18.

Each sample was solder mounted on a substrate, a side surface of the multilayer ceramic capacitor of the sample was pressed with a pin. At that time, a product in which a laminate was broken was determined as a G product, and a product in which a fixed portion to the substrate was peeled was determined as an NG product. The number of evaluations for each example was 10.

Table 4 shows the number of short circuits generated between the external electrodes for each of the above examples and results of fixation strength checked at the time of mounting.

Table 4 also shows that the multilayer ceramic capacitor of Example 19 had a ratio E/B of the overall circumferential length E of the external electrode to the outer peripheral length B of the multilayer ceramic capacitor, being about 0.52 within a range of about 0.33 or more and about 0.83 or less, and a distance G between external electrodes on the main surface, being about 80 μm less than about 100 μm, so

TABLE 4

|  |  | Example 14 | Example 15 | Example 2 | Example 16 | Example 17 | Example 18 | Example 19 |
|---|---|---|---|---|---|---|---|---|
| Dimension L | (mm) | 0.6 | 0.6 | 0.6 | 0.6 | 0.6 | 0.6 | 0.6 |
| Dimension W | (mm) | 0.6 | 0.6 | 0.6 | 0.6 | 0.6 | 0.6 | 0.6 |
| Multilayer ceramic capacitor outer peripheral length: B | (mm) | 2.4 | 2.4 | 2.4 | 2.4 | 2.4 | 2.4 | 2.4 |
| Length of external electrode in width direction at position of ½ of surface WT in lamination direction | (mm) | 0.1 | 0.15 | 0.225 | 0.15 | 0.25 | 0.26 | 0.26 |
| Length of external electrode in lengthwise direction at position of ½ of surface LT in lamination direction | (mm) | 0.05 | 0.05 | 0.05 | 0.15 | 0.25 | 0.26 | 0.05 |
| External electrode entire circumferential length: E | (mm) | 0.6 | 0.8 | 1.1 | 1.2 | 2 | 2.08 | 1.24 |
| Distance between external electrodes on main surface: G | (mm) | 0.4 | 0.3 | 0.15 | 0.3 | 0.1 | 0.08 | 0.08 |
| Ratio: E/B |  | 0.25 | 0.33 | 0.46 | 0.50 | 0.83 | 0.87 | 0.52 |
| The number of short circuits due to migration at mounting | (piece) | 0/18 | 0/18 | 0/18 | 0/18 | 0/18 | 2/18 | 2/18 |
| Fixation strength at mounting | (piece) | 1/10 | 0/10 | 0/10 | 0/10 | 0/10 | 0/10 | 0/10 |

Table 4 shows that when the external electrode was varied in overall circumferential length E in the multilayer ceramic capacitor of each of Examples 2, and 15 to 17, a ratio E/B of the overall circumferential length E to the outer peripheral length B of the multilayer ceramic capacitor was about 0.33 or more and about 0.83 or less, and the distance G between the external electrodes on the main surface was about 100 μm or more. Thus, no short circuit generated between the external electrodes due to migration at the time when the multilayer ceramic capacitor was mounted on a substrate was found, and there was no problem in fixation strength when the multilayer ceramic capacitor was mounted on the substrate.

Table 4 shows that while the distance G between the external electrodes on the main surface was about 100 μm or more in the multilayer ceramic capacitor of Example 14, a ratio E/B of the overall circumferential length E of the external electrode to the outer peripheral length B of the multilayer ceramic capacitor was about 0.25 outside of a range of about 0.33 or more and about 0.83 or less. Thus, no short circuit generated between the external electrodes due to migration at the time when the multilayer ceramic capacitor was mounted on a substrate was found; however, one NG product defective in fixation strength when the multilayer ceramic capacitor was mounted on the substrate was found. That is, it was impossible to secure a sufficient external electrode area at this time, such that bonding force on the substrate at the time of mounting is decreased.

Table 4 shows that the multilayer ceramic capacitor of Example 18 had a ratio E/B of the overall circumferential length E of the external electrode to the outer peripheral length B of the multilayer ceramic capacitor, being about 0.87 outside of a range of about 0.33 or more and about 0.83 or less, and a distance G between external electrodes on the main surface, being about 80 μm less than about 100 μm, so that there was no problem in fixation strength when the multilayer ceramic capacitor was mounted on a substrate; however, two products each having a short circuit due to migration when the multilayer ceramic capacitor was mounted on the substrate were found.

that there was no problem in fixation strength when the multilayer ceramic capacitor was mounted on a substrate; however, two products in each of which migration was caused when the multilayer ceramic capacitor was mounted on the substrate were found.

Experimental Example 3

In Experimental Example 3, an experiment was conducted to measure ESL under predetermined conditions.

According to the non-limiting example of a method for manufacturing a multilayer ceramic capacitor, described in the first preferred embodiment described above, samples of multilayer ceramic capacitors of Examples 2, and 20 to 23, having specifications described below were produced as examples.

Examples 20 to 23 were obtained by changing a distance g between external electrodes provided on a side surface to which an internal electrode was extended. Other common specifications were as follows:

The multilayer ceramic capacitor had the following size (design value): L×W×T=about 0.60 mm×about 0.60 mm×about 0.09 mm;

The outer peripheral length B was about 2.4 mm;

The external electrode had a length of about 0.050 mm in the lengthwise direction y at a center or approximate center of a surface LT (a third side surface or a fourth side surface) in the lamination direction x;

The dielectric layer had an average thickness of about 0.8 μm;

The internal electrode had an average thickness of about 0.5 μm;

Example 20

The external electrode had a length of about 0.15 mm in the width direction z at a center or approximate center of a surface WT (a first side surface or a second side surface) in the lamination direction x;

The distance g between external electrodes on the side surface to which the internal electrode was extended was about 0.30 mm; and The ratio g/W was about 0.50.

Example 21

The external electrode had a length of about 0.25 mm in the width direction z at a center or approximate center of a surface WT (a first side surface or a second side surface) in the lamination direction x;

The distance g between external electrodes on the side surface to which the internal electrode was extended was about 0.10 mm; and The ratio g/W was about 0.17.

Example 2

The external electrode had a length of about 0.225 mm in the width direction z at a center or approximate center of a surface WT (a first side surface or a second side surface) in the lamination direction x;

The distance g between external electrodes formed on the side surface to which the internal electrode was extended was about 0.15 mm; and The ratio g/W was 0.25.

Example 22

The external electrode had a length of about 0.20 mm in the width direction z at a center or approximate center of a surface WT (a first side surface or a second side surface) in the lamination direction x;

The distance g between external electrodes on the side surface to which the internal electrode was extended was about 0.20 mm; and The ratio g/W was 0.33.

Example 23

The external electrode had a length of about 0.175 mm in the width direction z at a center or approximate center of a surface WT (a first side surface or a second side surface) in the lamination direction x;

The distance g between external electrodes on the side surface to which the internal electrode was extended was about 0.25 mm; and The ratio g/W was about 0.42.

The ESL was measured by measuring impedance at about 100 MHz using a network analyzer (E5071B manufactured by Agilent Technologies).

Measurement results of the ESL for the respective examples described above are shown in Table 5.

TABLE 5

|  |  | Example 20 | Example 21 | Example 2 | Example 22 | Example 23 |
|---|---|---|---|---|---|---|
| Dimension L | (mm) | 0.6 | 0.6 | 0.6 | 0.6 | 0.6 |
| Dimension W | (mm) | 0.6 | 0.6 | 0.6 | 0.6 | 0.6 |
| Length of external electrode in width direction at position of ½ of surface WT in lamination direction | (mm) | 0.15 | 0.25 | 0.225 | 0.2 | 0.175 |
| Distance between external electrodes on side surface | (mm) | 0.30 | 0.10 | 0.15 | 0.20 | 0.25 |
| Ratio: g/W |  | 0.50 | 0.17 | 0.25 | 0.33 | 0.42 |
| ESL | (pH) | 52 | 44 | 46 | 47 | 49 |

Table 5 shows that the multilayer ceramic capacitor of each of Examples 2, and 20 to 23 had a favorable ESL, and the multilayer ceramic capacitor of each of Examples 2, and 21 to 23 had a ratio g/W of the distance g between the external electrodes provided on the side surface to which the internal electrode is extended, to the dimension W of the multilayer ceramic capacitor, in the width direction z, being about 0.42 or less. Thus, it was discovered that each of Examples 2, and 20 to 23 had an ESL of less than about 50 pH, which was favorable.

The above results enable the advantageous effects achieved by preferred embodiments of the present invention to be discovered.

In the above description of preferred embodiments of the present invention, combinable structures may be combined with each other. The preferred embodiments disclosed herein are to be considered to be example in every point and not to be restrictive. The scope of the present invention is shown in the scope of claims, instead of the above description, and is intended to include meaning equivalent to the scope of claims and all modifications in the scope of claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a laminate including:
      a plurality of dielectric layers and a plurality of internal electrodes that are laminated;
      a first main surface and a second main surface, facing each other in a lamination direction;
      a first side surface and a second side surface, facing each other in a lengthwise direction orthogonal or substantially orthogonal to the lamination direction; and
      a third side surface and a fourth side surface, being orthogonal to each other in a width direction orthogonal or substantially orthogonal to the lamination direction and the lengthwise direction; and
   a plurality of external electrodes disposed on corresponding side surfaces of the first, second, third, and fourth side surfaces of the laminate; wherein
   the plurality of internal electrodes include:
      a plurality of first internal electrodes and a plurality of second internal electrodes alternately laminated with the plurality of dielectric layers interposed therebetween;
      the plurality of first internal electrodes each including a first extended portion that extends to one of the first side surface, the second side surface, the third side surface, and the fourth side surface, and a second extended portion that extends to another one of the first side surface, the second side surface, the third side surface, and the fourth side surface other than the one to which the first extended portion extends;

the plurality of second internal electrodes each including a third extended portion that extends to one of the first side surface, the second side surface, the third side surface, and the fourth side surface, and a fourth extended portion that extends to another one of the first side surface, the second side surface, the third side surface, and the fourth side surface other than the one to which the third extended portion extends;

the plurality of external electrodes each extend to the second main surface, and include a first external electrode connected to the first extended portion, a second external electrode connected to the second extended portion, a third external electrode connected to the third extended portion, and a fourth external electrode connected to the fourth extended portion;

the multilayer ceramic capacitor has a dimension L in the lengthwise direction and a dimension W in the width direction, and the dimensions satisfy:

about $0.85 \leq W/L \leq$ about 1 and L≤about 750 μm;

the multilayer ceramic capacitor has a dimension T in the lamination direction that includes a thickness of at least one of the plurality of external electrodes on the second main surface of the laminate, and the dimension T satisfy:

about 70 μm≤T≤about 110 μm; and the laminate has a dimension t in the lamination direction, and a region in which the first internal electrode and the second internal electrode are laminated has a dimension t' in the lamination direction, and a ratio of the dimensions satisfy:

t'/t≥about 0.55.

2. The multilayer ceramic capacitor according to claim 1, wherein a straight line connecting the first extended portion and the second extended portion and a straight line connecting the third extended portion and the fourth extended portion intersect each other when the multilayer ceramic capacitor is viewed from the lamination direction.

3. The multilayer ceramic capacitor according to claim 1, wherein the first extended portion and the fourth extended portion extend to positions facing each other, and the second extended portion and the third extended portion extend to positions facing each other, on the corresponding side surfaces of the laminate.

4. The multilayer ceramic capacitor according to claim 1, wherein
the plurality of external electrodes disposed on the corresponding side surfaces of the laminate have a total length E and the multilayer ceramic capacitor has an outer peripheral length B, a ratio E/B being about 0.33 or more and about 0.83 or less; and
a distance between external electrodes adjacent to each other of the plurality of external electrodes disposed on the second main surface is about 100 μm or more.

5. The multilayer ceramic capacitor according to claim 1, wherein
when one of the internal electrodes is extended to at least one of the first side surface and the second side surface, a distance $g_1$ between external electrodes that are adjacent to each other of the plurality of external electrodes, disposed on the at least one of the first side surface and the second side surface to which the one of the internal electrodes is extended, and the dimension W of the multilayer ceramic capacitor in the width direction satisfy $g_1/W \leq$ about 0.42, when one of the internal electrodes is extended to at least one of the third side surface and the fourth side surface, a distance $g_2$ between the external electrodes that are adjacent to each other of the plurality of external electrodes, disposed on the at least one of the third side surface and the fourth side surface to which the one of internal electrodes is extended, and the dimension L of the multilayer ceramic capacitor in the lengthwise direction satisfy:

$g_2/L \leq$ about 0.42; and when the one of the internal electrodes is extended to the at least one of the first side surface and the second side surface, and the one of the internal electrodes is extended to the at least one of the third side surface and the fourth side surface, the distance $g_1$ between the external electrodes that are adjacent to each other of the plurality of external electrodes, disposed on the at least one of the first side surface and the second side surface to which an internal electrode is extended, and the distance $g_2$ between the external electrodes that are adjacent to each other of the plurality of external electrodes, disposed on the at least one of the third side surface and the fourth side surface to which an internal electrode is extended, satisfy:

$g_1/W \leq$ about 0.42, and $g_2/L \leq$ about 0.42.

6. The multilayer ceramic capacitor according to claim 1, wherein an external electrode of the plurality of external electrodes disposed one of the first, second, third, and fourth side surfaces to which no internal electrode is extended covers at least one of short sides of the one of the first, second, third, and fourth side surfaces and a portion from opposite ends of the at least one short side to an intermediate portion of each of long sides thereof, in a U-shape.

7. The multilayer ceramic capacitor according to claim 6, wherein the external electrode disposed on the one of the first, second, third, and fourth side surfaces to which no internal electrode is extended has a length β in a direction connecting short sides of the external electrode covering the short side of the one of the first, second, third, and fourth side surfaces to which no internal electrode is extended, and a length α in a direction connecting the short sides of the external electrode covering long sides of the one of the first, second, third, and fourth side surfaces, and a ratio β/α is about 0.2 or more and about 1.0 or less.

8. The multilayer ceramic capacitor according to claim 6, wherein the external electrode disposed on the one of the first, second, third, and fourth side surfaces to which no internal electrode is extended has the length β in the direction connecting short sides of the external electrode covering the short side of the one of the first, second, third, and fourth side surfaces to which no internal electrode is extended, and the length α in the direction connecting the short sides of the external electrode covering long sides of the one of the first, second, third, and fourth side surfaces, and the ratio β/α is about 0.2 or more and about 0.5 or less.

9. The multilayer ceramic capacitor according to claim 1, wherein the plurality of external electrodes are not disposed on the first main surface.

10. The multilayer ceramic capacitor according to claim 1, wherein the laminate has a rectangular or substantially rectangular parallelepiped shape.

11. The multilayer ceramic capacitor according to claim 1, wherein the laminate includes rounded corners and ridgeline portions, wherein each of the corners is a portion at which three surfaces of the laminate intersect with each other, and each of the ridgeline portions is a portion at which two surfaces of the laminate intersect with each other.

12. The multilayer ceramic capacitor according to claim 1, wherein
the plurality of dielectric layers include outer layers and effective layers;
the outer layers are positioned on a side of the first main surface and a side of the second main surface of the laminate;
the outer layers include a first outer layer that is positioned between the first main surface and an internal electrode of the plurality of internal electrodes closest to the first main surface, and a second outer layer that is positioned between the second main surface and an internal electrode of the plurality of internal electrodes closest to the second main surface; and
the effective layers are sandwiched between the first outer layer and the second outer layer.

13. The multilayer ceramic capacitor according to claim 12, wherein each of the first outer layer and the second outer layer has a thickness of about 3 μm or more and about 15 μm or less.

14. The multilayer ceramic capacitor according to claim 12, wherein each of the first outer layer and the second outer layer has a thickness of about 3 μm or more and about 13 μm or less.

15. The multilayer ceramic capacitor according to claim 12, wherein each of the first outer layer and the second outer layer has a thickness of about 3 μm or more and about 9 μm or less.

16. The multilayer ceramic capacitor according to claim 1, wherein the plurality of dielectric layers are made of dielectric ceramic.

17. The multilayer ceramic capacitor according to claim 1, wherein each of the plurality of internal electrodes has an average thickness of about 0.4 μm or more and about 1.0 μm or less.

18. The multilayer ceramic capacitor according to claim 1, wherein each of the plurality of internal electrodes has an average thickness of about 0.4 μm or more and about 0.8 μm or less.

19. The multilayer ceramic capacitor according to claim 1, wherein each of the plurality of internal electrodes has an average thickness of about 0.4 μm or more and about 0.6 μm or less.

* * * * *